US008977509B2

(12) United States Patent
Yamamura et al.

(10) Patent No.: US 8,977,509 B2
(45) Date of Patent: Mar. 10, 2015

(54) OPERATION INFORMATION OUTPUT DEVICE, METHOD FOR CONTROLLING OPERATION INFORMATION OUTPUT DEVICE, MONITORING DEVICE, METHOD FOR CONTROLLING MONITORING DEVICE, AND CONTROL PROGRAM

(75) Inventors: Kenji Yamamura, Kyoto (JP); Hiroshi Saito, Shiga (JP); Shintaro Kitagawa, Kanagawa (JP); Taisuke Tateishi, Nara (JP); Maki Endo, Kyoto (JP); Chisato Nakashima, Nara (JP)

(73) Assignee: Omron Corporation, Kyoto (JP)

( * ) Notice: Subject to any disclaimer, the term of this patent is extended or adjusted under 35 U.S.C. 154(b) by 786 days.

(21) Appl. No.: 13/248,515

(22) Filed: Sep. 29, 2011

(65) Prior Publication Data
US 2012/0078670 A1 Mar. 29, 2012

Related U.S. Application Data

(63) Continuation of application No. PCT/JP2010/001402, filed on Mar. 2, 2010.

(30) Foreign Application Priority Data

Apr. 10, 2009 (JP) .................................. 2009/096320
Apr. 10, 2009 (JP) .................................. 2009/096323

(51) Int. Cl.
*G06F 19/00* (2011.01)
*G05B 19/418* (2006.01)
*G06Q 10/06* (2012.01)

(52) U.S. Cl.
CPC .......... *G05B 19/4184* (2013.01); *G06Q 10/063* (2013.01); *G05B 2219/32234* (2013.01); *G05B 2219/37348* (2013.01)
USPC ............................................. 702/60; 702/61

(58) Field of Classification Search
None
See application file for complete search history.

(56) References Cited

U.S. PATENT DOCUMENTS

2003/0061004 A1* 3/2003 Discenzo ...................... 702/182
2006/0212238 A1* 9/2006 Nisenblat et al. ............... 702/66
2010/0010688 A1* 1/2010 Hunter .......................... 700/300

FOREIGN PATENT DOCUMENTS

| JP | H04-340325 | 11/1992 |
|----|-----------|---------|
| JP | H06-40297 | 2/1994 |
| JP | 2004-70424 | 3/2004 |
| JP | 2004-186445 | 7/2004 |

(Continued)

OTHER PUBLICATIONS

Machine translation of JP 2008-097128.*

(Continued)

*Primary Examiner* — Jonathan C Teixeira Moffat
*Assistant Examiner* — Hien Vo
(74) *Attorney, Agent, or Firm* — Greenblum & Bernstein, P.L.C.

(57) ABSTRACT

An operation information output device includes: a power data acquirer that acquires time-series data of a physical quantity consumed or generated when production equipment executes a process; a single-cycle detector that detects time-series data of predetermined duration from the time-series data acquired by the power data acquirer, and an operation information acquirer that acquires operation information of the production equipment by use of the time-series data detected by the single-cycle detector, hence it becomes possible to easily calculate and determine detailed operation information.

17 Claims, 28 Drawing Sheets

(56) References Cited

FOREIGN PATENT DOCUMENTS

| | | |
|---|---|---|
| JP | 2006-11897 | 1/2006 |
| JP | 2008-97128 | 4/2008 |

OTHER PUBLICATIONS

International Search Report for corresponding International Application No. PCT/JP2010/001402, along with an English language version, dated Jun. 8, 2010.

International Preliminary Report on Patentability for corresponding International Application No. PCT/JP2010/001402, dated Oct. 11, 2011, along with an English language translation, dated Nov. 15, 2011.

U.S. Appl. No. 13/248,484 to Shintaro Kitagawa et al., filed Sep. 29, 2011.

U.S. Appl. No. 13/248,493 to Hiroshi Saito et al., filed Sep. 29, 2011.

U.S. Appl. No. 13/248,506 to Hiroshi Saito et al., filed Sep. 29, 2011.

\* cited by examiner

Fig. 9
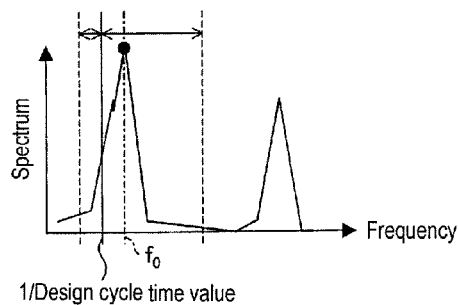
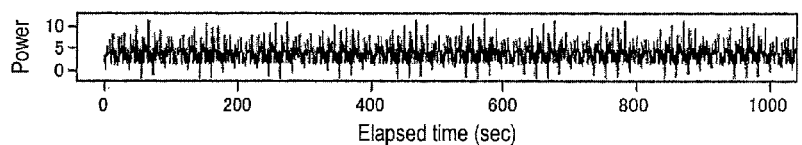
Fig. 10 (a)
Fig. 10 (b)
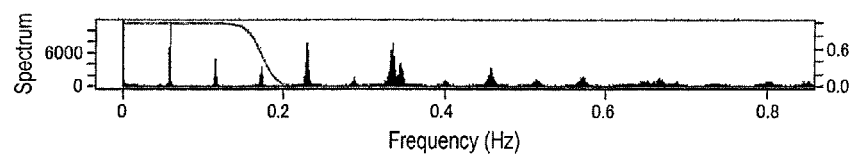
Fig. 11 (a)
Fig. 11 (b)

Example of machine tool

Start | End
Cycle time

Example of press machine

Start  End
Cycle time

OPERATION INFORMATION OUTPUT DEVICE, METHOD FOR CONTROLLING OPERATION INFORMATION OUTPUT DEVICE, MONITORING DEVICE, METHOD FOR CONTROLLING MONITORING DEVICE, AND CONTROL PROGRAM

CROSS-REFERENCE TO RELATED APPLICATIONS

This is a continuation application of PCT/JP/2010/001402 filed Mar. 2, 2010, designating the United States of America, the disclosure of which, including the specification, drawings, and claims, is incorporated by reference in its entirety. The disclosures Japanese Patent Application No. 2009-096320 filed on Apr. 10, 2009 and Japanese Patent Application No. 2009-096323 filed on Apr. 10, 2009, including the specifications, drawings, and claims are expressly incorporated by reference in their entireties.

TECHNICAL FIELD

The present invention relates to an operation information output device that outputs operation information of production equipment in a production line, a method that controls the operation information output device, and a program that controls the operation information output device. The present invention further relates to a monitoring device that monitors production equipment repeatedly executing a predetermined processing process in a production line, a method that controls the monitoring device, and a program that controls the monitoring device.

BACKGROUND TECHNOLOGY

Conventionally, at machining factories, a plurality of pieces of production equipment is placed in line to perform multiple steps required to produce products, providing a production line that produces products in a flow process. Further, in fields of production management, it is always required to improve productivity in the production lines and to promote energy saving, such as a reduction in power consumption and the like.

Operation information (i.e., operation-state, power consumption, and the like) of each piece of production equipment in a production line is useful in improving productivity of the production line and saving energy.

Thus, for example, a technology disclosed in Patent Literature 1 measures power consumption for each piece of production equipment, and stores an operation-state of the piece of production equipment in a memory. The operation-state is determined based on power consumption of the piece of production equipment and power consumption of other pieces of production equipment corresponding to the piece of production equipment.

Patent Literature 2 discloses a technology that measures in real time an operation signal that specifies an operation-state of production equipment, determines the operation-state based on characteristics of the measured signal, and stores the operation-state as operation information.

In addition, in order to improve productivity, it is necessary to perform maintenance on production equipment at proper timing. Thus, for example, a power system monitoring system described in Patent Literature 3 changes timing of maintenance based on whether or not electric current flowing through the power system equipment exceeds reference electric current and whether or not a shut-off operation has been performed. In addition, a maintenance and inspection time informing device described in Patent Literature 4 measures mileage of vehicles, such as an automobile. When the mileage reaches a predetermined distance, the maintenance and inspection time informing device informs a driver of an arrival of maintenance time by displaying a warning or the like. Moreover, a machine tool power monitoring device described in Patent Literature 5 issues an alert based on the amount of average power and the amount of fluctuation in instantaneous power of the machine tool in order to prompt for maintenance and repair.

RELATED ART

Patent Literature

Patent Literature 1: Japanese Patent Laid-open Publication No. 2008-97128 (Published on Apr. 24, 2008)
Patent Literature 2: Japanese Patent Laid-open Publication No. 2004-70424 (Published on Mar. 4, 2004)
Patent Literature 3: Japanese Patent Laid-open Publication No. H4-340325 (Published on Nov. 26, 1992)
Patent Literature 4: Japanese Patent Laid-open Publication No. H6-40297 (Published on Feb. 15, 1994)
Patent Literature 5: Japanese Patent Laid-open Publication No. 2006-11897 (Published on Jan. 12, 2006)

SUMMARY OF THE INVENTION

Shortcomings Resolved by the Invention

As shown in FIG. 20, conventional technologies have configurations that acquire operation information output from a PLC (Programmable Logic Controller) that controls production equipment. FIG. 20 is an explanatory diagram illustrating a mechanism for acquiring the operation information with the conventional technologies. In the example shown in FIG. 20, an operation information control server 71 acquires operation information from a PLC 72 of each of a production line A, a production line B, and a production line C. The PLC may be installed in each line, or may be installed in each piece of production equipment of each line.

In order to acquire the operation information from a PLC, however, a ladder program of an existing PLC needs to be modified, or an existing PLC needs to be replaced with a PLC that is capable of acquiring the operation information. A conventional PLC cannot acquire operation information without any modification. In addition to a PLC, a power meter is also required in order to measure power consumption, which is one of the operation information.

Further, configurations of Patent Literatures 1 and 2 determine a basic operation-state such as a production-state, stop-state, and a preparation-state based on change in an operation signal over time, and store the operation-state. However, the configurations cannot calculate and determine more detailed operation information, for example, a product type, a production quantity, a cycle time, and the like.

Herein, a cycle time is an amount of time required for one process of repetitive processes, such as a work, a task or a job, and is a unit of frequency or a cycle of the process. FIG. 21 provides charts illustrating examples of temporal fluctuations in power consumed by production equipment, for showing the cycle time. For example, in a case of a machine tool as shown in FIG. 21(a), a single-cycle is a period from a start to an end of a process on a work (object to be produced).

In a case of a press machine, process time spent to process one work is very short (0.5 ms, or the like). As shown in FIG.

21(*b*), however, when a press operation is repeatedly performed on the predetermined number of products, followed by a predetermined stand-by period, it is possible to consider that a set of the above repetitive press operation and the stand-by period is repeatedly performed. Therefore, a period from a start of the press operation to an end of the stand-by period can be regarded as a single-cycle.

In general, maintenance of production equipment intends to prevent a breakdown and breakage, and to improve productivity. Conventionally, however, timing of maintenance has been determined from an aspect preventing a breakdown and breakage rather than an aspect of improving productivity. This is probably because costs required for maintenance and loss due to a breakdown and breakage can be accurately estimated. On the other hand, it is difficult to accurately estimate a profit due to improved productivity after the maintenance.

As described above, the conventional configurations cannot easily calculate and determine detailed operation information.

In order to address the circumstances above, an object of the present invention is to provide an operation information output device and others that easily calculate and determine detailed operation information. Further, another object of the present invention is to provide a monitoring device and others that can determine timing of equipment maintenance from an aspect of improving a processing capacity.

In order to address the circumstances above, an operation information output device according to the present invention is an operation information output device that outputs operation information of production equipment, and includes a power data acquirer that acquires time-series data of a physical quantity consumed or generated when the production equipment performs a process; a single cycle detector that detects time-series data of predetermined duration from the time-series physical quantity data acquired by the power data acquirer; and an operation information acquirer that acquires operation information of the production equipment, using the time-series data detected by the single cycle detector.

A method that controls an operation information output device according to the present invention is a method that controls an operation information output device that outputs operation information of production equipment, and includes a physical quantity acquiring step that acquires time-series data of a physical quantity consumed or generated when the production equipment performs a process; a data detecting step that detects time-series data of predetermined duration from the time-series physical quantity data acquired in the physical quantity acquiring step; and an operation information acquiring step that acquires the operation information of the production equipment, using the time-series data detected in the data detecting step.

With the configuration or the method, the time-series data of the predetermined duration is detected from the time-series data of the physical quantity consumed or generated when the production equipment performs the process. Then, the operation information of the production equipment is acquired from the detected time-series data. Thus, it is possible to acquire the operation information from the time-series data of the physical quantity consumed or generated when the production equipment performs the process, thereby making it possible to easily acquire the operation information.

Herein, an example of the predetermined duration includes, for example, a design value of a cycle time of the production equipment.

In order to address the circumstances above, a monitoring device according to the present invention is a monitoring device that monitors equipment performing a process, and includes a power data acquirer that acquires time-series data of a physical quantity consumed or generated when the equipment performs the process; a single cycle detector that detects time-series data for a predetermined period from the time-series physical quantity data acquired by the power data acquirer; and a maintenance determiner that determines whether or not maintenance should be performed on the equipment based on the period of the time-series data detected by the single cycle detector.

In order to address the circumstances above, a method that controls a monitoring device according to the present invention is a method that controls a monitoring device that monitors equipment performing a process, and includes a physical quantity acquiring step that acquires time-series data of a physical quantity consumed or generated when the equipment performs the process; a detecting step that detects time-series data for a predetermined period from the time-series physical quantity data acquired in the physical quantity acquiring step; and a maintenance determining step that determines whether or not maintenance should be performed on the equipment based on the duration of the time-series data detected in the detecting step.

Herein, examples of time-series data detected by the single cycle detector include time-series data of a cycle time, time-series data including a plurality of the cycle times, time-series data of a predetermined period and the like. A cycle time is an amount of time required for one process of repetitive processes, such as a work, a task, or a job, and is a unit of frequency or a cycle of the process.

When the predetermined period becomes short, an amount of time required for equipment to perform a process also becomes short, thereby improving a processing capacity of the equipment. In other words, the predetermined duration is a quantity that relates to an improvement in the processing capacity of the equipment.

Thus, with the configuration and the method, the time-series data of the physical quantity consumed or generated when the equipment performs the process is acquired. The time-series data of the predetermined duration is detected from the acquired time-series data. Based on the duration of the acquired time-series data, a determination is made on whether or not maintenance should be performed on the equipment. As a result, it is possible to determine whether or not the maintenance should be performed from an aspect of improving the processing capacity of the equipment. In addition, since used measured value is only the time-series data of the physical quantity consumed or generated when the equipment performs the process, the timing of the maintenance can be easily determined.

The operation information output device and the monitoring device may be constructed by a computer. In such a case, the present invention includes a control program controlling the operation information output device, the control program realizing a control method controlling the operation information output device by causing the computer to acts as each of the above steps. The present invention further includes a control program controlling the monitoring device, the control program causing the computer to realize a control method controlling the monitoring device. Furthermore, the present invention includes a computer-readable recording medium that stores at least either one of the control programs. For example, a non-transitory computer readable storage medium is provided having computer instructions stored thereon comprising a program that controls an operation information output device that outputs operation information of production equipment, the program causing the computer to perform acquiring time-series data of a physical quantity consumed or generated when the production equipment performs a process, detecting time-series data of predetermined duration from the acquired time-series physical quantity data, acquiring the operation information of the production equipment, using the detected time-series data, wherein the detecting detects a single-cycle portion of the acquired time-series physical quantity data in a case where the single cycle is from a start to an end of a process on one production object performed by the production equipment. As another example, a non-transitory computer readable storage medium is provided having computer instructions stored thereon comprising a program that controls a monitoring device that monitors equipment performing a process, the program causing the computer to perform acquiring time-series data of a physical quantity consumed or generated when the equipment performs the process, detecting time-series data for a predetermined period from the acquired time-series physical quantity data, and determining whether or not maintenance should be performed on the equipment based on duration of the detected time-series data.

[Effects of the Invention]

As described above, an operation information output device according to the present invention has an effect such that the operation information output device can acquire operation information from time-series data of a physical quantity consumed or generated when production equipment performs a process.

Further, a monitoring device according to the present invention acquires time-series data of a physical quantity consumed or generated when equipment performs a process, and detects time-series data for a predetermined period from the acquired time-series data. The monitoring device further determines whether or not maintenance should be performed on the equipment based on the duration of the detected time-series data. Thus, the monitoring device according to the present invention has an effect such that the monitoring device can determine whether or not the maintenance should be performed from an aspect of improving a processing capacity of the equipment.

Other objects, characteristics, and advantages of the present invention will be fully understood by the description hereinafter. Further, merits of the present invention will be evident from the following descriptions with reference to the accompanying drawings.

BRIEF DESCRIPTION OF THE DRAWINGS

FIG. 9 A chart illustrating an example of a frequency spectrum around a reciprocal of a design cycle time value $D_{ct}^{-1}$, for explaining a method that detects a fundamental frequency according to the embodiment of the present invention.

FIG. 10 A chart illustrating an example of power data before and after execution of a filtering process by a filtering process executor according to the embodiment of the present invention.

FIG. 11 A chart illustrating frequency spectrums for the respective power data shown in FIG. 10 according to the embodiment of the present invention.

EMBODIMENTS

First Embodiment

One embodiment of the present invention is described with reference to the drawings FIGS. 1 to 7. First, an entire configuration of the present embodiment is described with reference to FIG. 3. FIG. 3 is an explanatory diagram illustrating a relationship among an operation information output device 1, power meters 2, and production equipment 3 according to the present embodiment. As shown in FIG. 3, a plurality of production equipment 3 is provided in a production line 5 in the present embodiment. The power meters 2 that measure electric energy provided to each of the plurality of production equipment 3 are connected to the operation information output device 1. Examples of the production equipment 3 include arbitrary process machines, such as a press machine, an injection molding machine, a washer, and the like.

The operation information output device 1 analyzes waveforms of power that is consumed by the production equipment 3 and acquired from the power meter 2. The operation information output device 1 further calculates or determines operation information of the production equipment 3, such as operation-state time, stop-state time, load-state time, a product type, a production quantity, a cycle time, and the like, and outputs the operation information. The operation information output device 1 can output the operation information based only on power consumption of the production equipment 3 acquired from the power meter 2. Thus, a necessity of modifying a ladder program of a conventional PLC or introducing a new PLC is eliminated. Therefore, the operation information can be easily output.

The operation information can be used to improve productivity and to reduce energy consumption of the entire production line 5.

Figure 1:
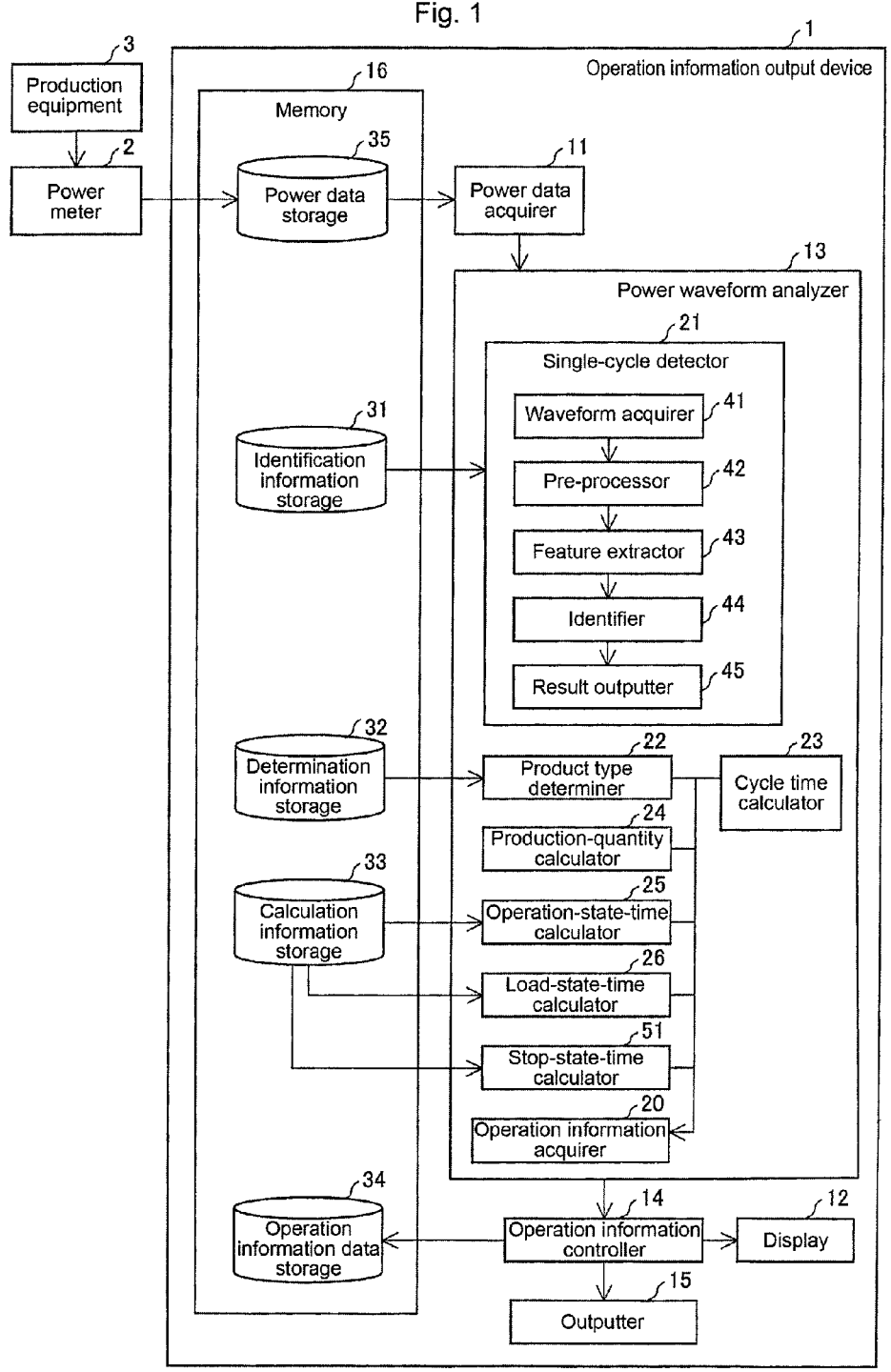
FIG. 1 A block diagram illustrating a configuration of main components of an operation information output device according to an embodiment of the present invention.

Next, a configuration of main components of the operation information output device 1 is described with reference to FIG. 1. FIG. 1 is a block diagram illustrating the configuration of the main components of the operation information output device 1 according to the present embodiment. As shown in FIG. 1, the operation information output device 1 includes a power data acquirer 11, a display 12, a power waveform analyzer 13, an operation information controller 14, an outputter 15, and a memory 16. The memory 16 stores information and is configured with a nonvolatile memory, such as a flash memory, ROM (Read Only Memory), or the like, and a volatile memory, such as a RAM (random Access Memory). In the present embodiment, the memory 16 includes an identification information storage 31, a determination information storage 32, a calculation information storage 33, an operation information data storage 34, and a power data storage 35.

The identification information storage 31 stores identification information that is used by a single-cycle detector 21, which is described later, to detect a single-cycle. The identification information includes, for example, a waveform of power consumed by the production equipment 3 and frequency characteristics of a single-cycle of power consumed by the production equipment 3 in a period from a start to an end of a process (single cycle) on the object to be produced by the production equipment 3 with respect to each type of an object to be produced.

The determination information storage 32 stores determination information that is used by a product type determiner 22, which is described later, to determine a type of a product produced by the production equipment 3. The determination information is a table showing a relationship between a cycle time (period from the start to the end of a process by the production equipment 3 on an object to be produced) and the product type.

The calculation information storage 33 stores calculation information that is used by an operation-state-time calculator 25, a load-state-time calculator 26, and a stop-state-time calculator 51, all of which are described later, to calculate an operation-state time, a load-state time, and a stop-state time, respectively. Specifically, the calculation information storage 33 stores a relationship between the power consumption of the production equipment 3 and each of the operation-state time, the load-state time, and the stop-state time of the production equipment 3.

Figure 2:
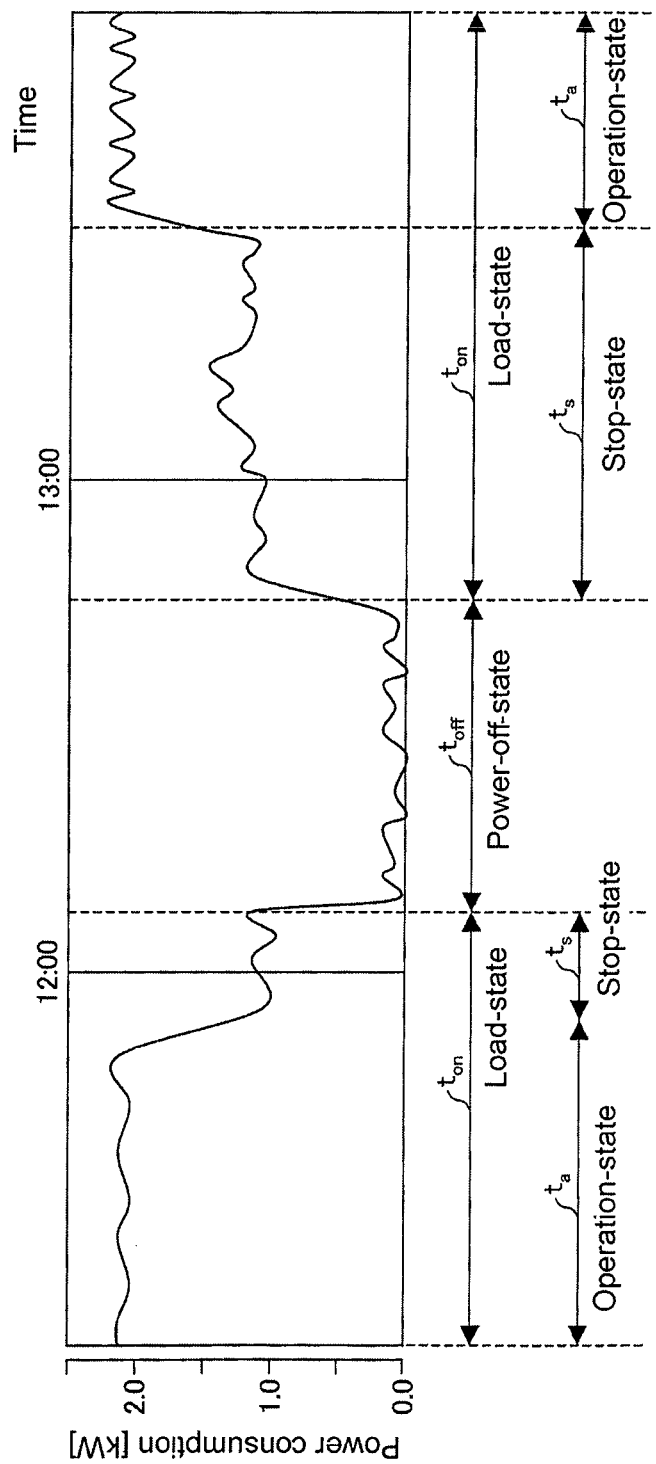
FIG. 2 A chart illustrating an operation status of a press machine.
Figure 3:
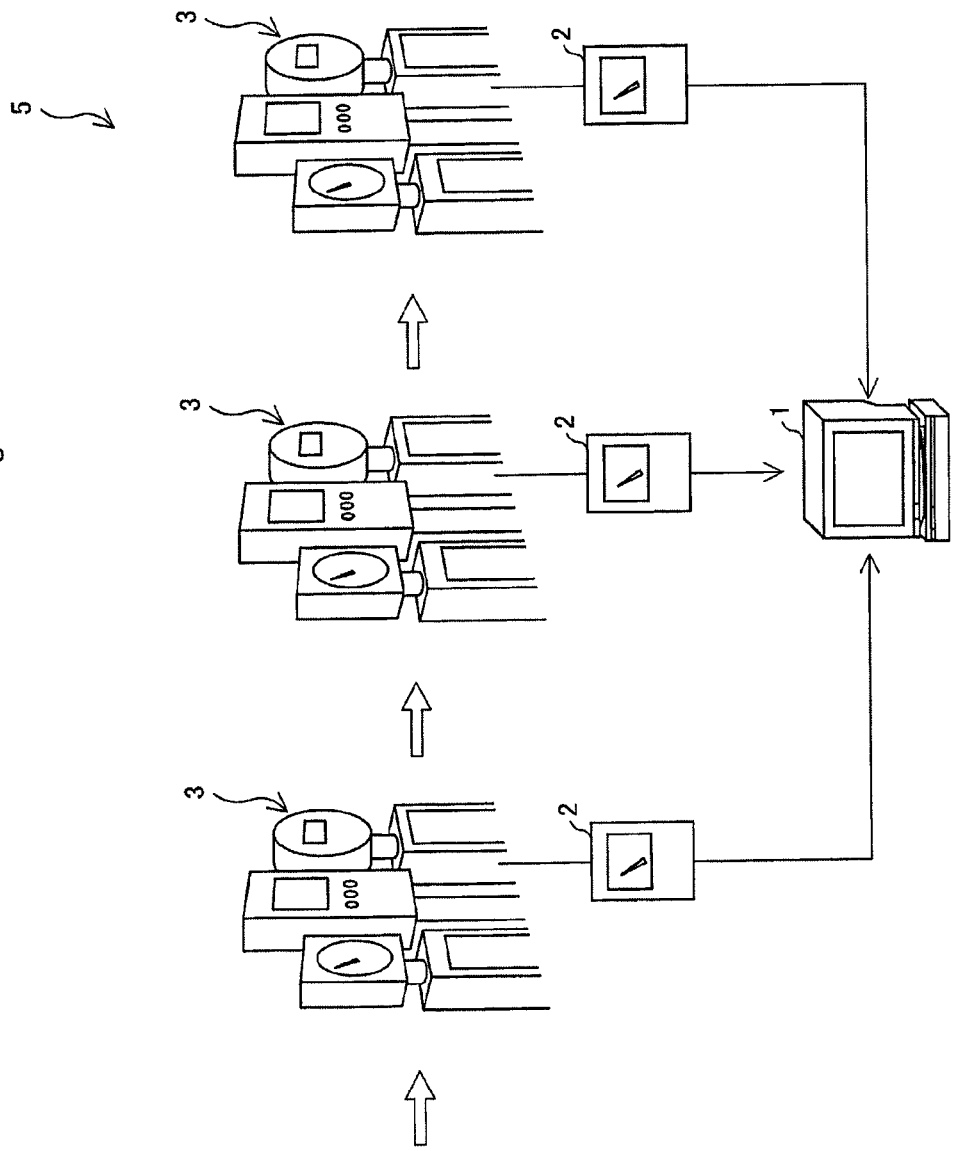
FIG. 3 An explanatory diagram illustrating a relationship among the operation information output device, a power meter, and production equipment according to the embodiment.

An operation-state, a load-state, and a stop-state are described here, with reference to FIG. 2. FIG. 2 is a chart illustrating an operation status of a press machine. Specifically, FIG. 2 is a graph illustrating a temporal fluctuation in power consumption (kW) consumed by the press machine. FIG. 2 shows a graph that covers several hours. A press machine is used as an example of production equipment in FIG. 2, however, the same can be said for other types of production equipment.

In the graph of FIG. 2, a time $t_{off}$, in which power consumption is close to 0 kW, is a period when the press machine is in an off-state. This state is referred to as a power-off-state. On the other hand, a time $t_{on}$, which is a period excluding the power-off-state time $t_{off}$, is a period when the press machine is an on-state. This state is referred to as a load-state. The period when the press machine is in the load-state is referred to as a load-state time.

Within the load-state time $t_{on}$, a time $t_s$, in which power consumption is low, is a period when the press machine is stopped. This state is referred to as a stop-state. The period when the press machine is in the stop-state is referred to as a stop-state time. Examples of causes that create the stop-state include, for example, a breakdown or unexpected malfunction of facilities, a retooling due to a process change (change of works, jigs, or the like), a replacement of consumable parts (cutting tool or the like), a start-up (warm-up after powering on or the like) and a shut-off of the facilities (preparation before powering off or the like), and the like.

Within the load-state time $t_{on}$, a time $t_{ct}$, in which power consumption is high, is a period when the press machine is operating. This state is referred to as an operation-state. A period when the press machine is in the operation-state is referred to as an operation-state time.

The operation information data storage 34 stores operation information calculated or determined by the operation information output device 1.

The power data storage 35 stores electric energy (total power consumption) that the production equipment 3 has consumed, and power (power consumption) that the production equipment 3 is consuming, the electric energy and the power being measured by the power meter 2.

The power data acquirer 11 acquires power consumption of the production equipment 3 measured by the power meter 2 and stored in the power data storage 35. Specifically, the power data acquirer 11 acquires time-series data, for a predetermined period, of the electric energy (total power consumption) that the production equipment 3 has consumed and the power (power consumption) that the production equipment 3 is consuming. Then, the power data acquirer 11 transmits to a power waveform analyzer 13 the acquired data indicating the power consumption and the total power consumption.

The power waveform analyzer 13 analyzes the time-series data (waveform) of the power consumption acquired from the power data acquirer 11, and calculates or determines operation information. More specifically, the power waveform analyzer 13 includes the single-cycle detector 21, the product type determiner 22, a cycle-time calculator 23, a production-quantity calculator 24, the operation-state-time calculator 25, the load-state-time calculator 26, the stop-state-time calculator 51, and an operation information acquirer 20.

The single-cycle detector 21 detects a single-cycle portion out of the time-series data (waveform) of the power consumption acquired from the power data acquirer 11. More specifically, the single-cycle detector 21 includes a waveform acquirer 41, a pre-processor 42, a feature extractor 43, an identifier 44, and a result outputter 45. In general, power data for a single-cycle has various features. Thus, it is possible to detect the single-cycle portion of the power data by detecting the features.

The waveform acquirer 41 acquires data of predetermined duration out of the time-series data (waveform) of the power consumption acquired from the power data acquirer 11.

The pre-processor 42 removes noise and the like from the waveform of the power consumption of predetermined duration acquired by the waveform acquirer 41.

The feature extractor 43 extracts a predetermined feature from the waveform of the power consumption, from which the pre-processor 42 has removed the noise and the like.

The identifier 44 determines whether or not the waveform of the power consumption of predetermined duration corresponds to a single-cycle based on the feature extracted by the feature extractor 43 and the identification information stored in the identification information storage 31.

The result outputter 45 outputs a result determined by the identifier 44.

Figure 4:
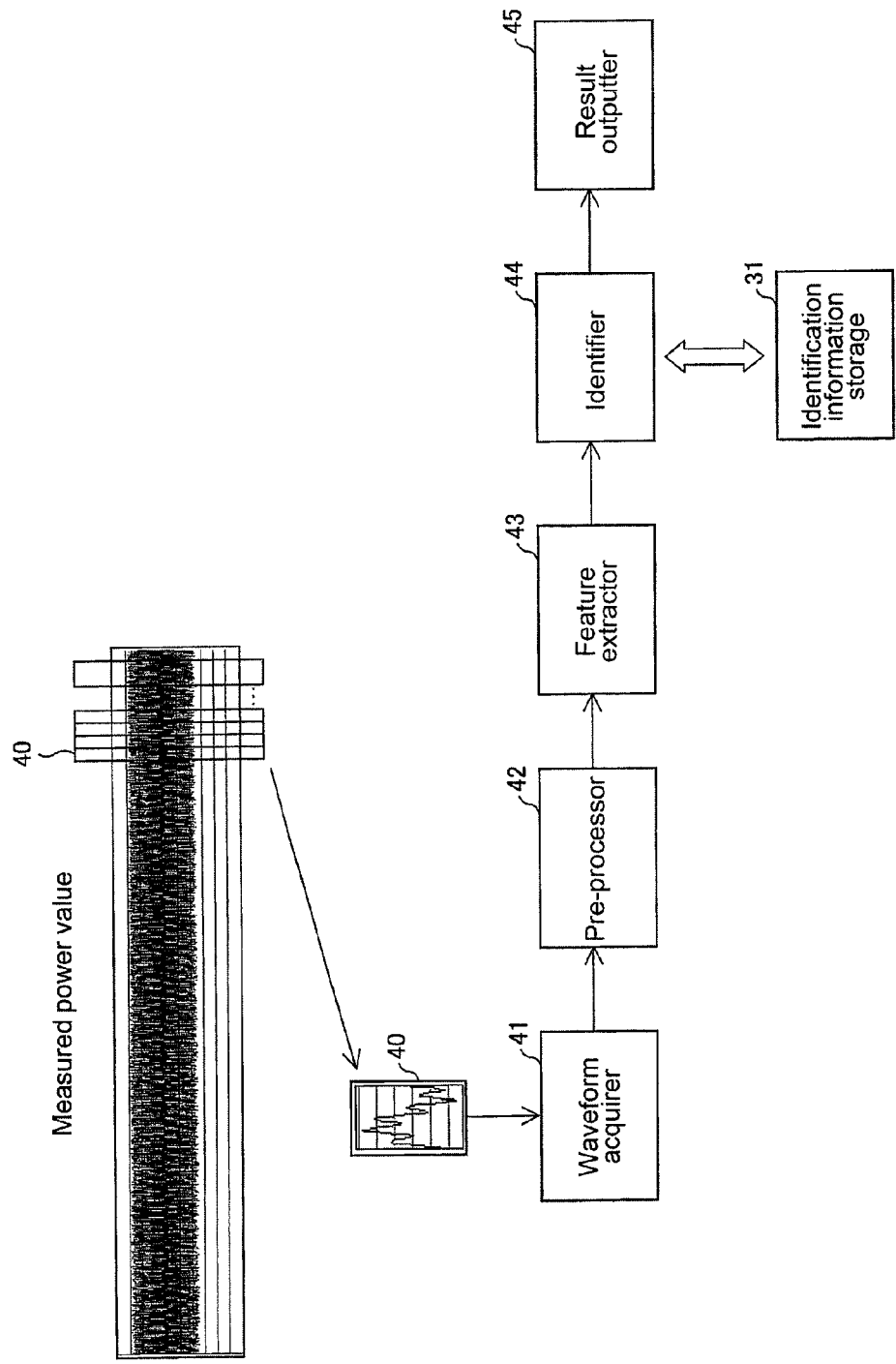
FIG. 4 An explanatory diagram illustrating a method employed by a single-cycle detector in order to detect a single-cycle portion from a waveform of power consumption by use of pattern identification according to an embodiment of the present invention.

A method, with which the single-cycle detector 21 detects a single-cycle portion out of the time-series data (waveform) of the power consumption acquired by the power data acquirer 11 by use of pattern identification, is described with reference to FIG. 4. FIG. 4 is an explanatory diagram illustrating the method, with which the single-cycle detector 21 detects the single-cycle portion out of the waveform of the power consumption by use of the pattern identification. As shown in FIG. 4, when a single-cycle portion is detected by use of the pattern identification, first, the waveform acquirer 41 acquires a waveform (power pattern 40) of predetermined duration out of the time-series power consumption data (waveform) acquired by the power data acquirer 11. Then, the pre-processor 42 removes noise and the like from the power pattern 40. The feature extractor 43 extracts a feature of the power pattern 40 after the noise and the like has been removed therefrom. Thereafter, the identifier 44 identifies a single-cycle by comparing the extracted feature with the feature of the single-cycle stored in the identification information storage 31. Then, the result outputter 45 outputs a result.

A method for detecting a single-cycle portion is not limited to the pattern identification. Other known methods, such as a frequency analysis, a template matching, a statistical learning, and a constant total power consumption counting, and the like may be also used. Further, these methods may be used in combination.

The frequency analysis is a method that detects a single-cycle portion by use of a frequency feature of a waveform of power consumption. The template matching is a method that detects a single-cycle portion by comparing an acquired waveform with a pre-stored template of a single-cycle waveform. The statistical learning is a method that stores characteristics of single-cycle portions in the past and identifies a single-cycle portion by employing the characteristics. The constant total power consumption counting is a method that identifies a single-cycle when total power consumption reaches a predetermined value.

Figure 5:
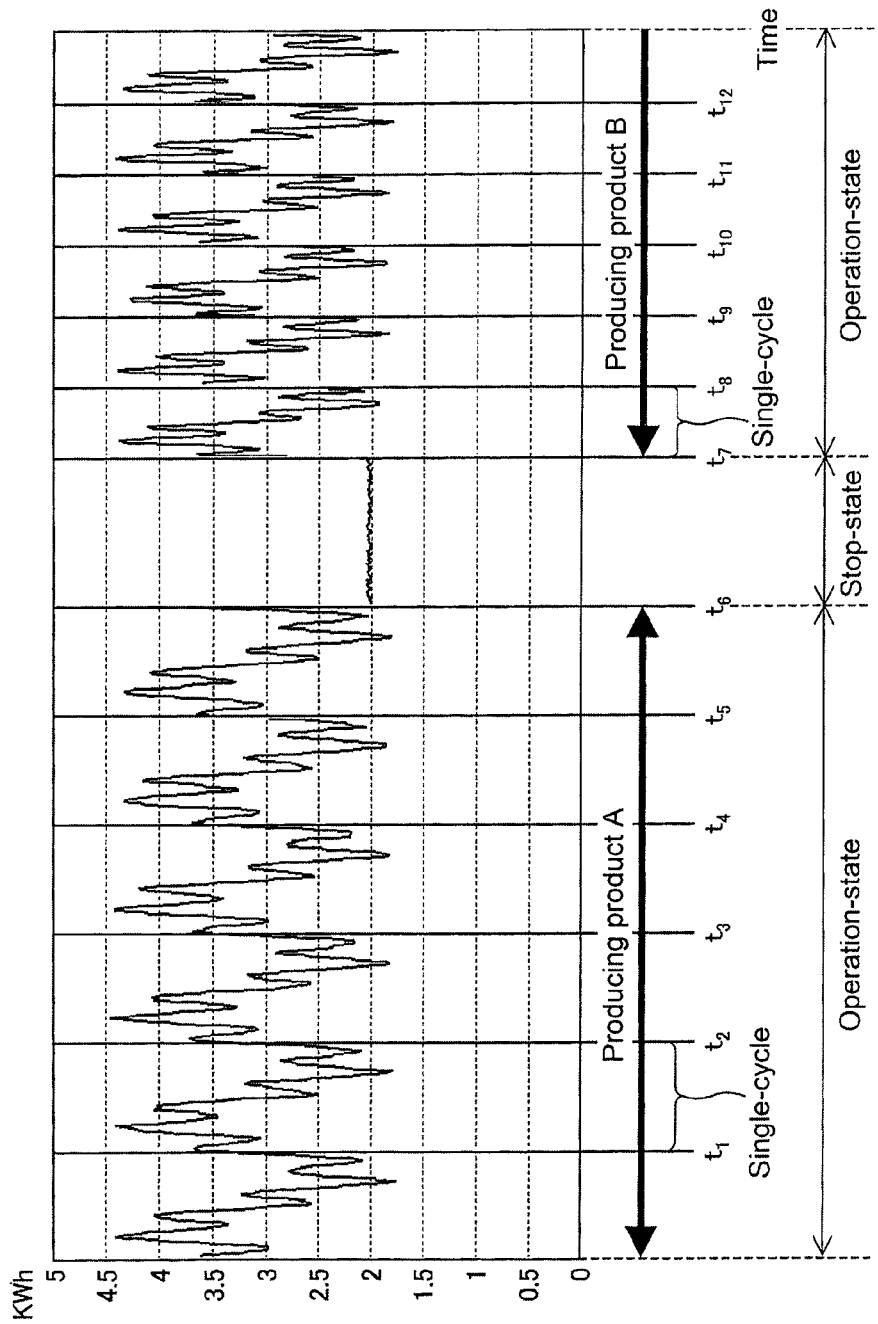
FIG. 5 A diagram illustrating a waveform of power consumption in a case where duration of a single-cycle is different depending on objects to be produced according to the embodiment.

The product type determiner 22 determines a type of a production object to be produced by the production equipment 3 by using a feature of a single-cycle portion detected by the single-cycle detector 21 and determination information stored in the determination information storage 32. For example, when duration of a single-cycle is different depending on production objects, a product type (operation information) of a production object can be determined based on the duration of a single-cycle. An explanation is provided with reference to FIG. 5. FIG. 5 is a diagram illustrating a waveform of power consumption in a case where duration of a single-cycle is different depending on production objects. In FIG. 5, a process is executed on a product A, as a production object, from time 0 to time $t_6$, and a process is executed on a product B, as a production object, at time $t_7$ and onward. An amount of time required for a single-cycle of the process on the product A differs from that of the process on the product B. Therefore, with the amount of time required for a single-cycle for each product being stored as determination information, it is possible to determine a product type of a production object based on the stored time for a single-cycle.

The cycle-time calculator 23 calculates duration of a single-cycle (cycle time, operation information) in a waveform of power consumption. The duration of the cycle time is calculated from timing, from which a characteristic point or a characteristic portion repeats in a waveform of power consumption.

The production-quantity calculator 24 calculates the number (production quantity, operation information) of production objects processed by the production equipment 3 within a predetermined period. The production quantity is calculated by counting the number of cycles within the predetermined period.

The operation-state-time calculator 25 calculates time spent for an operation-state (operation-state time, operation information) within a predetermined period, using calculation information stored in the calculation information storage 33. Instead of using the calculation information stored in the calculation information storage 33, the operation-state-time calculator 25 may calculate the operation-state time from the load-state time and the stop-state time calculated by the load-state-time calculator 26 and the stop-state-time calculator 51, respectively.

The load-state-time calculator 26 calculates time spent for a load-state (load-state time, operation information) within a predetermined period, using calculation information stored in the calculation information storage 33. Instead of using the calculation information stored in the calculation information storage 33, the load-state-time calculator 26 may calculate the load-state time from the operation-state time and the stop-state time calculated by the operation-state-time calculator 25 and the stop-state-time calculator 51, respectively.

The stop-state-time calculator 51 calculates time spent for a stop-state (stop-state time, operation information) within a predetermined period, using calculation information stored in the calculation information storage 33. Instead of using the calculation information stored in the calculation information storage 33, the stop-state-time calculator 51 may calculate the stop-state time from the operation-state time and the load-state time calculated by the operation-state-time calculator 25 and the load-state-time calculator 26, respectively.

The operation information acquirer 20 acquires operation information calculated or determined by each of the product type determiner 22, the cycle-time calculator 23, the production-quantity calculator 24, the operation-state-time calculator 25, the load-state-time calculator 26, and the stop-state-time calculator 51. The operation information acquirer 20 further transmits the operation information to the operation information controller 14.

The operation information controller 14 causes the operation information data storage 34 to store the operation information calculated and determined by the power waveform analyzer 13. The operation information controller 14 also transmits data indicating the operation information to the outputter 15 in a case where the operation information is transmitted to an external device. Further, the operation information controller 14 causes the display 12 to display the operation information.

The display 12 is a displaying apparatus to display information, such as operation information and the like, acquired from the operation information controller 14. The display 12 may be configured with a displaying device such as an LCD (Liquid Crystal Display), a CRT (Cathode-ray Tube), a plasma display, or the like.

The outputter 15 outputs operation information acquired from the operation information controller 14 to an external device in a case where the operation information is transmitted to the external device. Examples of a device that configures the outputter 15 include a print outputting device that prints information on print medium such as paper, a transmitting device that transmits a signal via a transmission medium, a recording device that stores data in a computer-readable recording medium, or the like.

Figure 6:
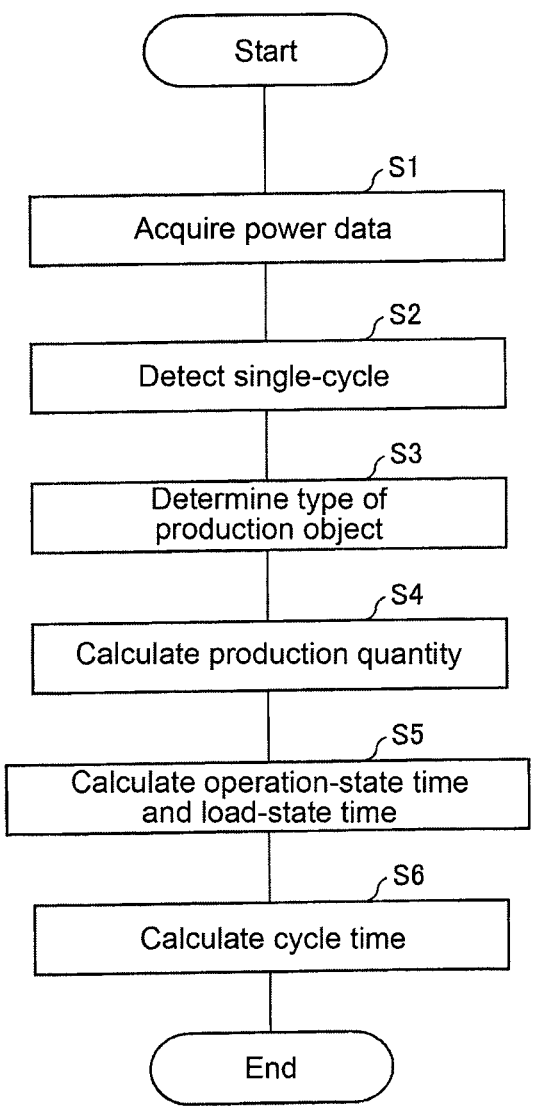
FIG. 6 A flowchart illustrating a process flow, in which the operation information output device calculates and determines operation information according to the embodiment.

Next, a flow of a process performed in the operation information output device 1 to calculate and determine operation information is described with reference to FIG. 6. FIG. 6 is a flowchart illustrating the process flow, with which the operation information output device 1 calculates and determines the operation information.

As shown in FIG. 6, the power data acquirer 11 acquires time-series power data for the period from a time of previous power data acquisition to the present time (S1). Next, the single-cycle detector 21 detects a single-cycle from the time-series power data acquired by the power data acquirer 11 (S2). Then, the production type determiner 22 determines a type of an object produced by the production equipment 3 (S3). Thereafter, the production-quantity calculator 24 calculates the number of production objects, on which the production equipment 3 has executed a process for a period indicated by the time-series power data acquired by the power data acquirer 11 (S4).

Next, the operation-state-time calculator 25 calculates duration of an operation-state in the production equipment 3 within the period indicated by the time-series power data acquired by the power data acquirer 11; and the load-state-time calculator 26 calculates duration of a load-state in the production equipment 3 within the same period (S5). Lastly, the cycle-time calculator 23 calculates a cycle time (S6), and the process is completed.

Second Embodiment

Figure 7:
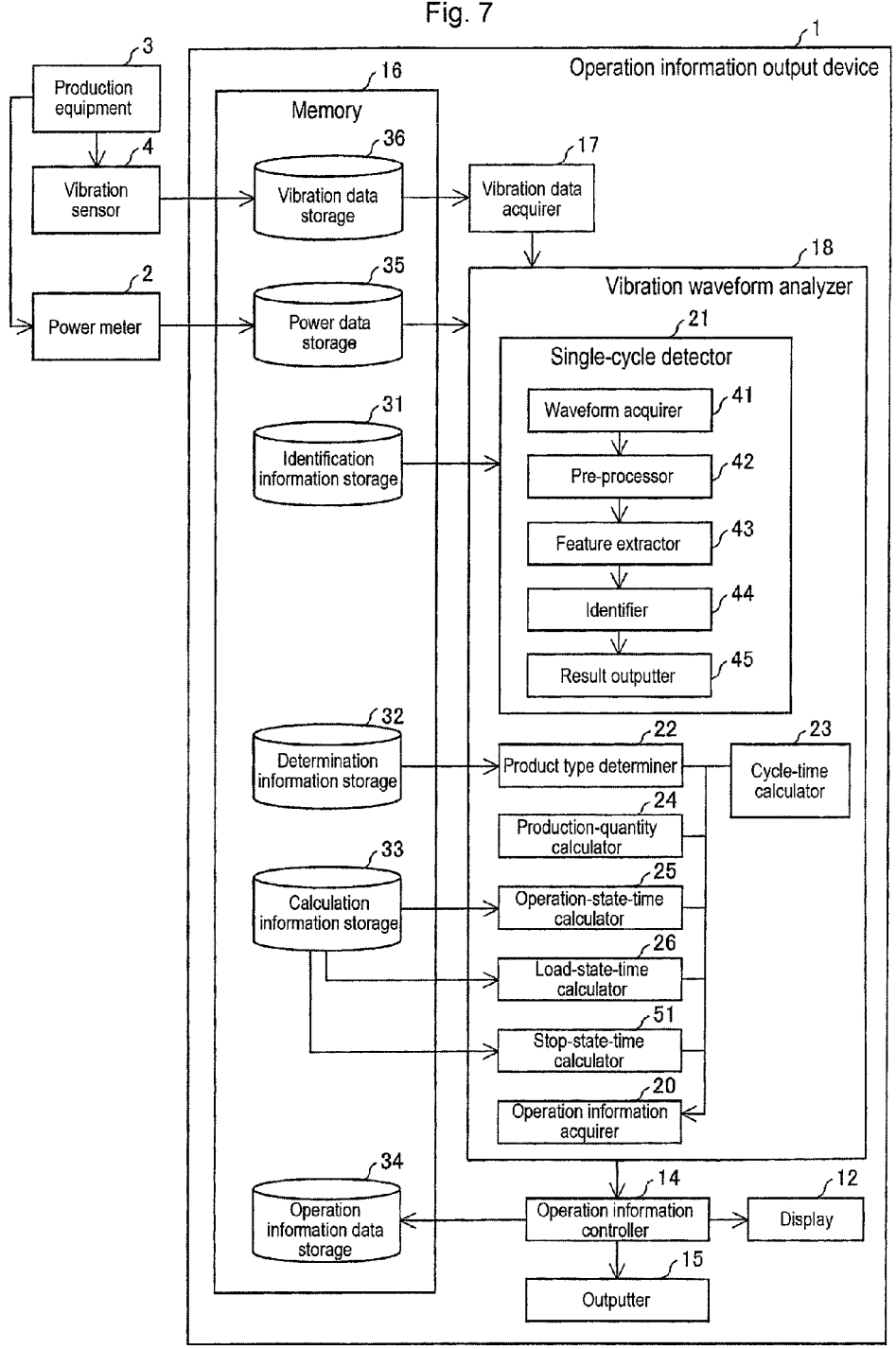
FIG. 7 A block diagram illustrating a configuration of main components of an operation information output device according to an embodiment of the present invention.

Hereinafter, another embodiment of the present invention is described with reference to FIG. 7. As a matter of convenience for a description, components having functions similar to those described in the first embodiment are provided with the same numerical references, and illustration thereof is omitted. FIG. 7 is a block diagram illustrating a configuration of main components of an operation information output device 1 according to the present embodiment.

The present embodiment differs from the first embodiment in that, instead of the time-series power data, time-series vibration data, which is an amount of displacement of the production equipment 3, is used to calculate and determine operation information. Thus, the present embodiment is provided with a vibration sensor 4 to the production equipment 3, a vibration data storage 36 to the memory 16, and a vibration data acquirer 17. Further, the present embodiment is provided with a vibration waveform analyzer 18 instead of the power waveform analyzer 13.

The vibration data storage 36 stores vibration data transmitted from the vibration sensor 4.

The vibration sensor 4 is a sensor that detects vibration. The vibration sensor 4 detects vibration of the production equipment 3 and causes the vibration data storage 36 to store vibration data indicating the detected vibration.

The vibration data acquirer 17 acquires time-series vibration data stored in the vibration data storage 36, and transmits the data to the vibration waveform analyzer 18.

The vibration waveform analyzer 18 analyzes the time-series vibration data (waveform) acquired from the vibration data acquirer 17, and calculates and determines operation information of the production equipment 3. The specific configuration of the vibration waveform analyzer 18 is similar to that of the power waveform analyzer 13, thus illustration thereof is omitted. The time-series vibration data for the vibration waveform analyzer 18 corresponds to the time-series power data for the power waveform analyzer 13.

In the above embodiment, the vibration sensor 4 is used to acquire time-series data, however, a configuration is not limited to this. Time-series data acquired by a flow sensor, a temperature sensor, a humidity sensor, a sound sensor, an image sensor, a proximity sensor, a photoelectric sensor, and the like, may be used to detect a single-cycle, and then to calculate and determine operation information.

Further, each of the above sensors may be used in combination with a power meter to detect a single-cycle, and then to calculated and determine operation information.

Third Embodiment

Next, another embodiment of the present embodiment is explained with reference to FIGS. 8 to 14. Compared with the operation information output device 1 shown in FIGS. 1 to 7, an operation information output device 1 of the present embodiment is different in terms of an operation of a single-cycle detector 21. Components having functions similar to those described in the previous embodiments are provided with the same numerical references, and illustration thereof is omitted.

The single-cycle detector 21 of the present embodiment employs a design cycle time value $D_{ct}$ and a frequency analysis to detect a starting point of a single-cycle of power data in order to detect power data for the single-cycle. Herein, the design cycle time value $D_{ct}$ is a design value of a cycle time set by a responsible person in a manufacturing floor, or the like.

Figure 8:
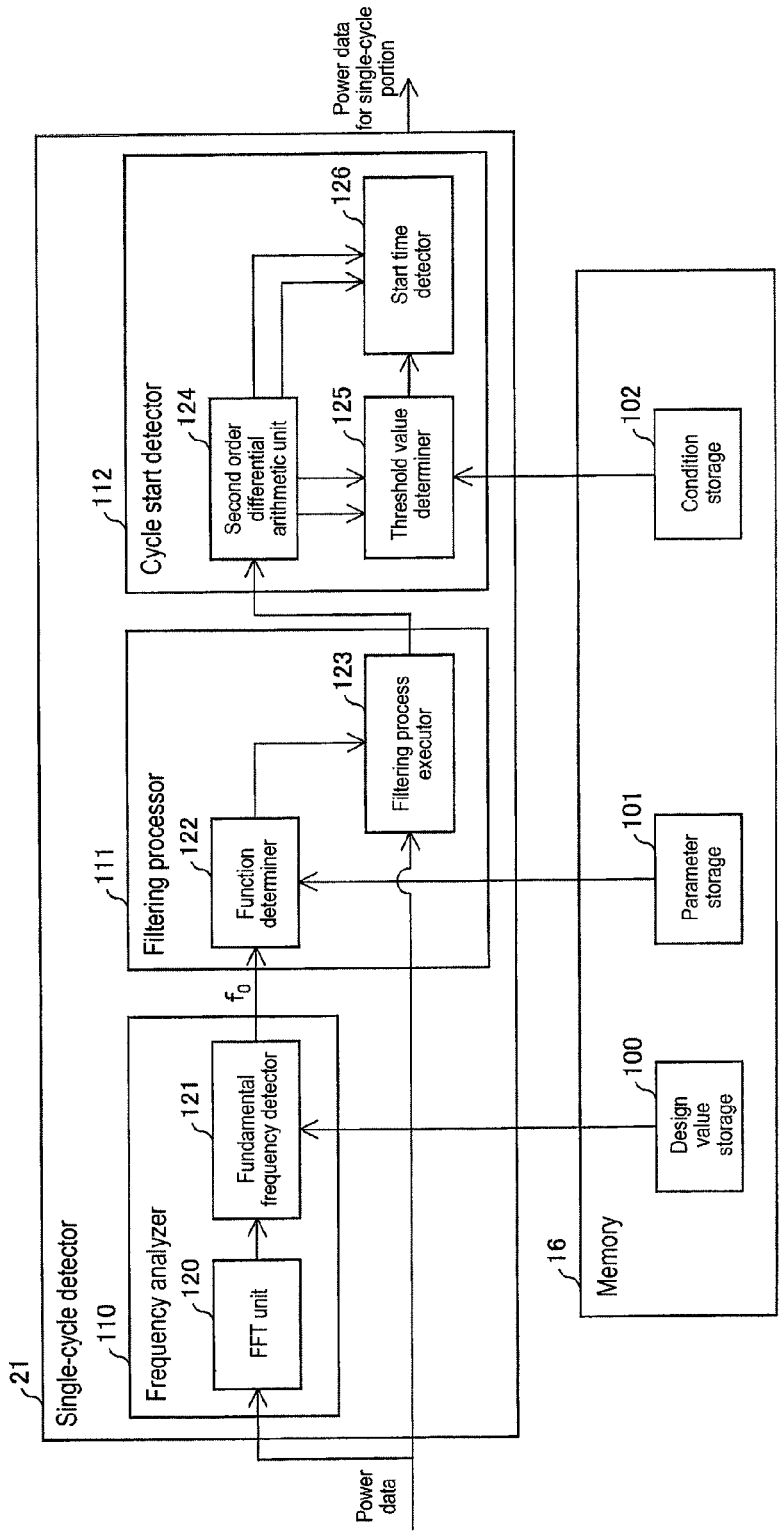
FIG. 8 A block diagram illustrating schematic configurations of a single-cycle detector and a memory that stores data used by the single-cycle detector according to an embodiment of the present invention.

FIG. 8 illustrates a schematic configuration of the single-cycle detector 21 and the memory 16 that stores data used by the single-cycle detector 21. As shown in FIG. 8, the single-cycle detector 21 includes a frequency analyzer 110, a filtering processor 111, and a cycle start detector 112. The memory 16 includes a design value storage 100, a parameter storage 101, and a condition storage 102.

The design value storage 100 stores the design cycle time values $D_{ct}$. The parameter storage 101 stores values of various parameters used by the filtering processor 111 for a filtering process. The condition storage 102 stores various conditions used to detect a stating point of a single-cycle. The design cycle time value $D_{ct}$, the various parameters, and the conditions are pre-stored in the design value storage 100, the parameter storage 101, and the condition storage 102, respectively, through an inputter (not shown) or the like.

The frequency analyzer 110 analyzes a frequency of power data and detects a fundamental frequency $f_0$ of a periodic waveform, using the design cycle time value $D_{ct}$. The frequency analyzer 110 includes an FFT unit 120 and a fundamental frequency detector 121.

The FFT unit 120 performs an FFT with respect to power data of predetermined duration. The FFT unit 120 transmits, to the fundamental frequency detector 121, data of frequency spectrum after the FFT is performed. The above-described predetermined duration may be any duration as long as later-described various statistical values can be acquired from the power data. An example includes a time $t_{ct}$, in which an operation-state continues for a period longer than several times of the design cycle time value $D_{ct}$.

The fundamental frequency detector 121 detects the fundamental frequency $f_0$ of a periodic waveform using the frequency spectrum data received from the FFT unit 120. The fundamental frequency detector 121 transmits the detected fundamental frequency $f_0$ to the filtering processor 111.

In the present embodiment, a range of frequency, in which the fundamental frequency is detected, is limited to a predetermined range including a reciprocal of a design cycle time value $D_{ct}^{-1}$ stored in the design value storage 100. Thus, it is possible to successfully acquire a fundamental frequency of a periodic waveform corresponding to a cycle time.

FIG. 9 illustrates a method that detects the fundamental frequency, and shows an example of the frequency spectrum around the reciprocal of design cycle time value $D_{ct}^{-1}$ as a line graph. In FIG. 9, a range between broken lines is the above-described predetermined range. The fundamental frequency detector 121 detects a frequency having a strongest frequency spectrum in the range between the broken lines as a fundamental frequency $f_0$. In the present embodiment, the frequency in the above-described predetermined range is 0.5 to 2 times of the reciprocal of the design cycle time value $D_{ct}^{-1}$.

The filtering processor 111 performs a filtering process (filtering) on the power data so as to emphasize a frequency component around the fundamental frequency $f_0$. The filtering process 111 includes a function determiner 122 and a filtering process executor 123.

The function determiner 122 uses the fundamental frequency $f_0$ received from the fundamental frequency detector 121, and determines a filtering function that is a function used for a filtering process. The function determiner 122 transmits, to the filtering process executor 123, information of the determined filtering function.

The present embodiment uses a following logistic function f(x) as a filtering function. It is also possible to use other functions as the filtering function.

$$f(x)=1/(1+\exp(s\times(x-fc)))$$

Herein, fc indicates a value of x when f=0.5, and corresponds to a cutoff frequency in the present embodiment. Further, in the present embodiment, the cutoff frequency is defined as $$fc = \text{fundamental frequency } f_0 \times \text{parameter } P_{aram}.$$

Further, "s" indicates a reduction rate of the logistic function, and is provided in a range $0 \le s \le$.

The filtering process executor 123 uses the filtering function received from the function determiner 122, and executes a filtering process on power data. The filtering process executor 123 transmits the filtered power data to the cycle start detector 112.

FIGS. 10 (a) and (b) are charts each illustrating examples of power data before and after an execution of a filtering process by the filtering process executor 123. FIGS. 11 (a) and (b) are charts each illustrating frequency spectrums for the respective power data shown in FIG. 10 (a) and (b).

FIGS. 11 (a) and (b) illustrate frequency characteristics of a logistic function that is a filtering function determined by the function determiner 122. In the illustrated example, $f_0$ 0.0573 Hz, $P_{aram}=3$ (hence, fc=0.1719 Hz), s=0.1. In addition, FIGS. 10 and 11 illustrate examples of a case where the production equipment 3 is an injection molding machine.

A comparison between FIGS. 11 (a) and (b) shows that an execution of the filtering process removes frequency components higher than the fundamental frequency $f_0$ and also equal to or higher than 0.2 Hz. In addition, a comparison between FIGS. 10 (a) and (b) shows that an execution of the filtering process makes a cycle waveform more distinctive.

The cycle start detector 112 detects a starting point of a single-cycle. When the production equipment 3 starts a process on a work, power consumption often suddenly increases. In fact, in referring to the filtered power data shown in FIG. 10 (b), it is understood that a rise, that is, a sudden increase of a power value, periodically occurs.

Thus, when a rise of the power value after the filtering process can be detected, it is possible to detect a starting point of a single-cycle. In the present embodiment, the rise of the power value is used as a starting point of a single-cycle.

Figure 12:
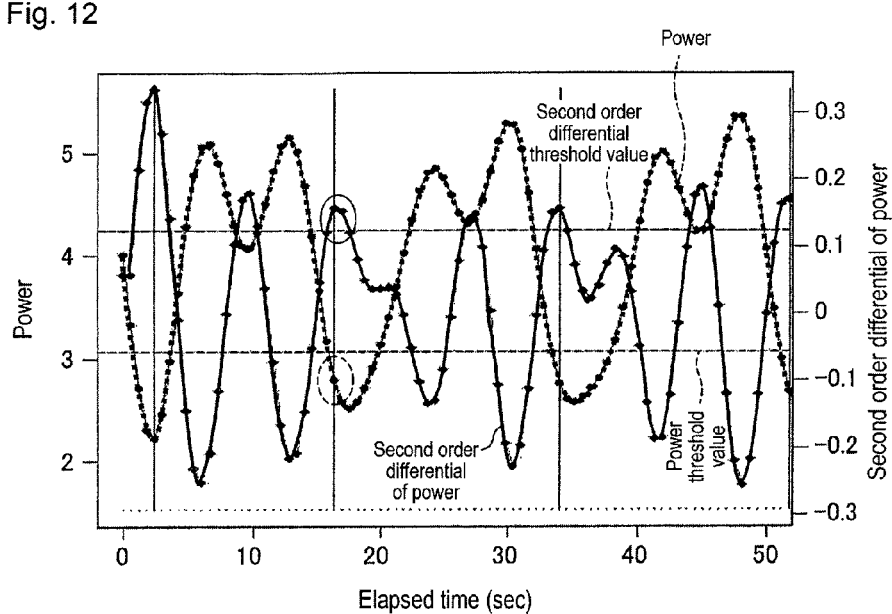
FIG. 12 A chart illustrating filtered power data and a second order differential data of the filtered power data according to the embodiment of the present invention.

Various methods are known for determining the rise of the power value. The detection method used in the present embodiment is described with reference to FIG. 12. FIG. 12 is a chart illustrating a power data after the filtering process and second order differential of the power data. In the chart, a solid line is a graph of the power data, and a dashed line is a graph of the second order differential of the power data.

As shown in FIG. 12, a power value after the filtering process is small immediately before the rise of the power value after the filtering process. Then, the slope of the power value sharply increases from negative to positive as time passes by. Thus, the second order differential value of the power value becomes large. Thus, it is possible to determine a rising point of the power value when a condition is met, the condition being that the power value is smaller than a threshold value and the second order differential value of the power value is greater than another threshold value. For example, in FIG. 12, locations enclosed by circles in the same line types as those of the graph lines meet the above condition. Thus, a point in time for those locations is determined as a rising point of the power value. Hereinafter, the above threshold value for the power value is referred to as a "power threshold value", and the above threshold value for the second order differential value of the power value is referred to as a "second order differential threshold value". Further, the above condition is referred to as a "rise detection condition".

Furthermore, additional requirements may be added to the rise detection condition. For example, even when the slope of the power value sharply increases as described above, in a case where the slope of the power value decreases immediately after that, the increase in the power value is suppressed. Thus, the increase cannot be referred to as the rise. Therefore, the rise detection condition may further include a requirement, such that the power value after a predetermined time period (e.g., five second) from the time of meeting the above condition is larger than the power threshold value.

In addition, as shown in FIG. 12, it is possible that the rise detection condition may be satisfied not only at one point in time, but also multiple points in time including the first point in time. Therefore, there may be a case where the above rise detection condition is satisfied at a plurality of points in time within a period equal to or shorter than 0.5 times of either one of the design cycle time value $D_{ct}$ and the fundamental period $T_0$, which is a reciprocal of the fundamental frequency $f_0$. In such a case, the rise detection condition may further include a requirement, such that a rising point of the power value is determined at a point in time when the second order differential value of the power value is the greatest.

Next, a method that determines the power threshold value and the second order differential threshold value is described. In referring to FIG. 12, it can be understood that power values need to periodically fall under the power threshold value. Therefore, the power threshold value is determined so as to be a value that can detect the power values that periodically fall under the power threshold value.

Figure 13:
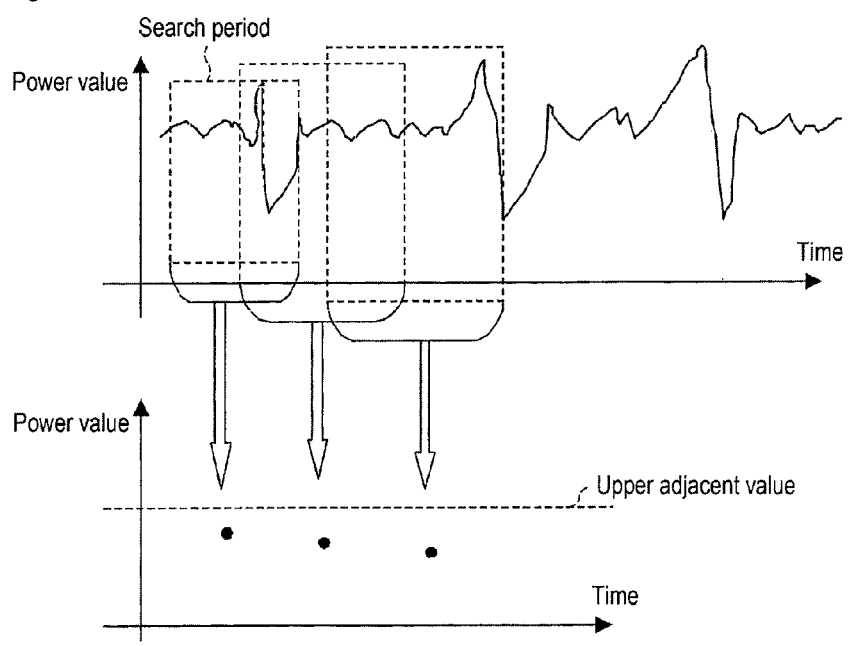
FIG. 13 A chart used to decide a power threshold value according to the embodiment of the present invention.

FIG. 13 is a chart used to decide the power threshold value. In the upper part in FIG. 13, a graph indicates a temporal fluctuation in power data, and the dashed lines each indicate search periods. In the lower part in FIG. 13, medians of the predetermined number of lowest power values of the power data in each search period are shown.

As the above-mentioned predetermined number, actual number may be employed, or a formula that obtains the predetermined number may be employed. Examples of such a formula include, for example, the following formula:

the predetermined number=$a/(f_0 * t_{sampling})$ (where the figure below the decimal point is rounded up)

Herein, "$t_{sampling}$" represents a sampling period of data measurement. Also, "$(f_0 * t_{sampling})^{-1}$" represents the number of data for the fundamental period $T_0$ (=$1/f_0$), and "a" represents its coefficient. In the present example, "a"=0.3. For example, when $t_0$=0.1719 Hz, and $t_{sampling}$=0.6 second, it is determined that the predetermined number=3. Therefore, the medians of the lowest three power values are calculated.

As shown in FIG. 13, in the present embodiment, a predetermined search period is set to be a certain time period on the upstream side. The median values are calculated for the predetermined number of the lowest power values within the power data included in the set search period. It is preferable that the search period has predetermined duration longer than the fundamental period $T_0$.

Next, the same process as described above is repeatedly performed while shifting the search period by a predetermined length of time to the downstream side. Then, an upper adjacent value of a set of the calculated median values is determined as the power threshold value. It is desirable that the predetermined length of time be shorter than the fundamental period $T_0$ and, more preferably, be about a half of the fundamental period $T_0$.

Herein, the upper adjacent value is a maximum value of data below a point, which is an upper hinge U+(H-spread h×a). The H-spread h is a distance between an upper hinge U and a lower hinge. The upper hinge is a median of data above a median of all data (75th percentile value). The lower hinge is a median of data below a median of all data (25th percentile value). The parameter "a", which typically is 1.5, is 2 in this embodiment, considering the margin to successfully detect a rise.

The second order differential threshold value can be determined by use of an approach opposite to the method that determines the power threshold value. Specifically, in referring to FIG. 12, it can be understood that the power values need to periodically exceed the second order differential threshold value. Thus, the second order differential threshold value is determined so as to be a value that can periodically detect the power values that exceed the second order differential threshold value.

In the present embodiment, a predetermined search period is set to be a certain time period on the upstream side. The median values are calculated for the predetermined number of the highest power values within the second order differential data included in the set search period. Next, the same process as described above is repeatedly performed while shifting the search period by a predetermined length of time to the downstream side. Then, a lower adjacent value of a set of the calculated median values is determined as the second order differential threshold value. Herein, the lower adjacent value is a minimum value of data above a point, which is a lower hinge L−(H-spread h×a).

Therefore, the cycle start detector 112 detects a rising point of a power value as a starting point of a single-cycle by use of power data, on which the filtering process executor 123 has performed a filtering process, and a second order differential of the power data. The cycle start detector 112 includes a second order differential arithmetic unit 124, a threshold value determiner 125, and a start time detector 126. Further, the condition storage 102 stores the above search period, the above predetermined number, the above predetermined length of time, and the parameter "a".

The second order differential arithmetic unit 124 calculates a second order differential of the filtered power data output from the filtering process executor 123. The second order differential arithmetic unit 124 transmits, to the threshold value determiner 125 and the start time detector 126, the calculated second order differential data along with the filtered power data.

The threshold value determiner 125 determines the power threshold value and the second order differential threshold value as described above, by use of the filtered power data and the second order differential data output from the second order differential arithmetic unit 124, and the search period, the predetermined number, the predetermined time length of time, and the parameter "a" stored in the condition storage 102. The threshold value determiner 125 transmits, to the start time detector 126, the determined power threshold value and second order differential threshold value.

The start time detector 126 detects a starting point of a single-cycle by use of the filtered power data and the second order differential data from the second order differential arithmetic unit 124, and the power threshold value and the second order differential threshold value from the threshold value determiner 125, based on the above-described rise detection condition. Thereby, the single-cycle detector 21 can detect power data for a single-cycle portion.

Figure 14:
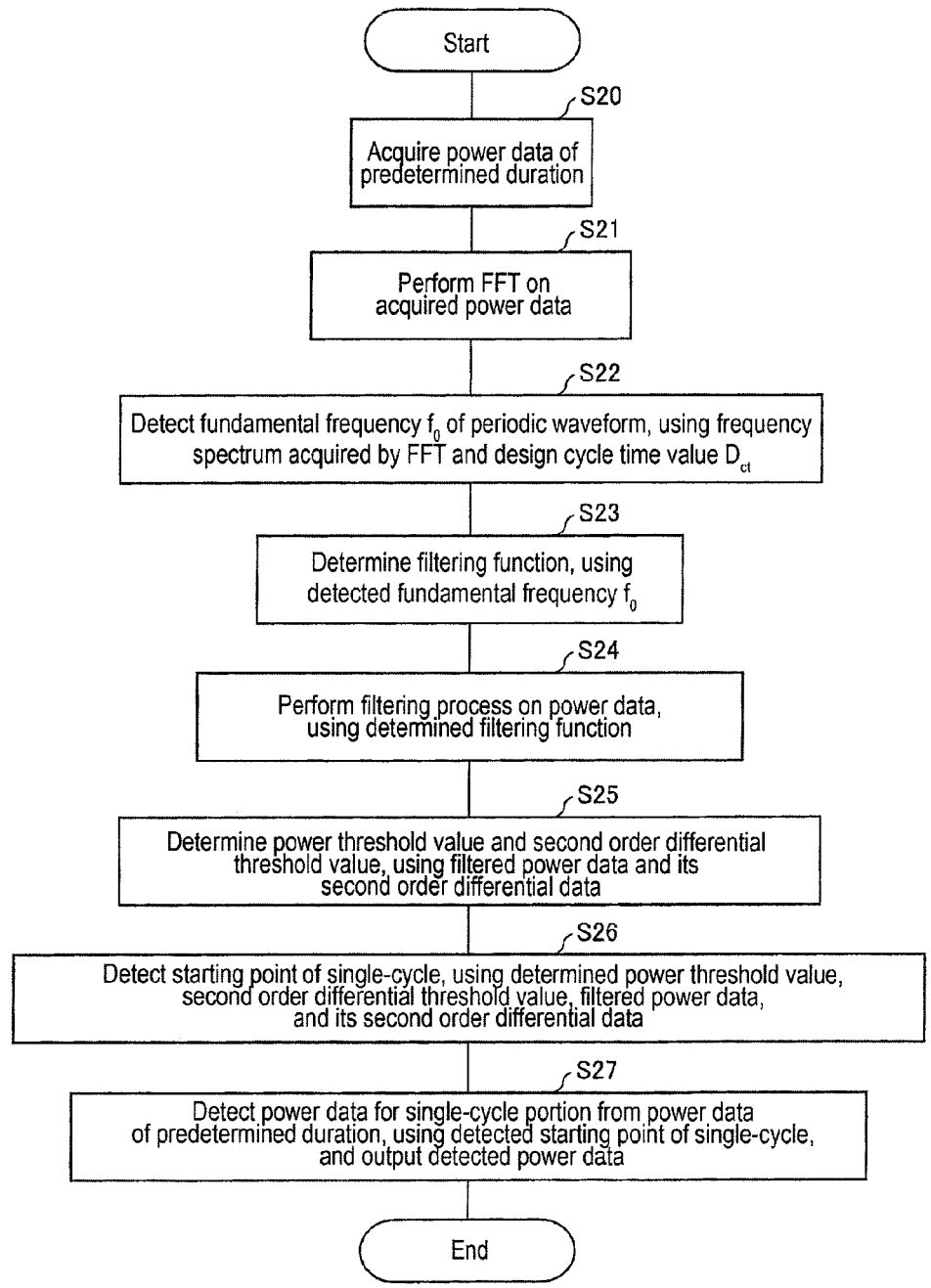
FIG. 14 A flowchart schematically illustrating a processing operation of the single-cycle detector according to the embodiment of the present invention.

Next, a processing operation of the single-cycle detector 21 in the operation information output device 1 having the above configuration is described with reference to FIG. 14. FIG. 14 schematically illustrates a processing operation of the single-cycle detector 21.

As shown in FIG. 14, the single-cycle detector 21 first acquires power data of predetermined duration from the power data storage 35 (S20). Next, the FFT unit 120 performs an FFT on the acquired power data (S21). The fundamental frequency detector 121 detects a fundamental frequency $f_0$ of a periodic waveform, by use of a frequency spectrum data acquired by performing the FFT and the design cycle time value $D_{ct}$ stored in the design value storage 100 (S22).

Next, the function determiner 122 determines a filtering function by use of the detected fundamental frequency $f_0$, and various parameters stored in the parameter storage 101 (S23). The filtering process executor 123 performs a filtering process on the power data by use of the determined filtering function (S24).

Next, the second order differential arithmetic unit 124 calculates a second order differential of the filtered power data; and then the threshold value determiner 125 determines a power threshold value and a second order differential threshold value by use of the second order differential data obtained from the calculation result, the filtered power data, and various data stored in the condition storage 102 (S25). Next, the start time detector 126 detects, based on the rise detection condition, a starting point of a single-cycle by use of the determined power threshold value and the second order differential threshold value, the filtered power data, and the second order differential data (S26). Then, the single-cycle detector 21 detects power data for a single-cycle portion out of the power data of predetermined duration acquired from the power data storage 30, by use of the detected starting point of the single-cycle, and outputs the detected power data (S27). Thereafter, the processing operation is completed.

The present embodiment detects a starting point of a single-cycle by use of power data and various set values. Thus, it is not necessary to use a pattern waveform.

The present embodiment determines a rising point of a power value as a starting point of a single-cycle. However, some types of the production equipment 3 start the processing after preparing for the processing. In this case, the starting point of the single-cycle is a starting point of the preparation. Thus, the starting point of the single-cycle deviates from the starting point of the processing, that is, the rising point of the power value. In many cases, however, the preparation period may be already known based on the operation of the production equipment 3. Further, power data of the preparation period may have specific characteristics. Therefore, by detecting the rising point of the power value, the starting point of the preparation, that is, the starting point of the single-cycle, can be easily acquired.

Similar to the detection of a rise of a power value, a fall of the power value may be detected.

Fourth Embodiment

Figure 15:
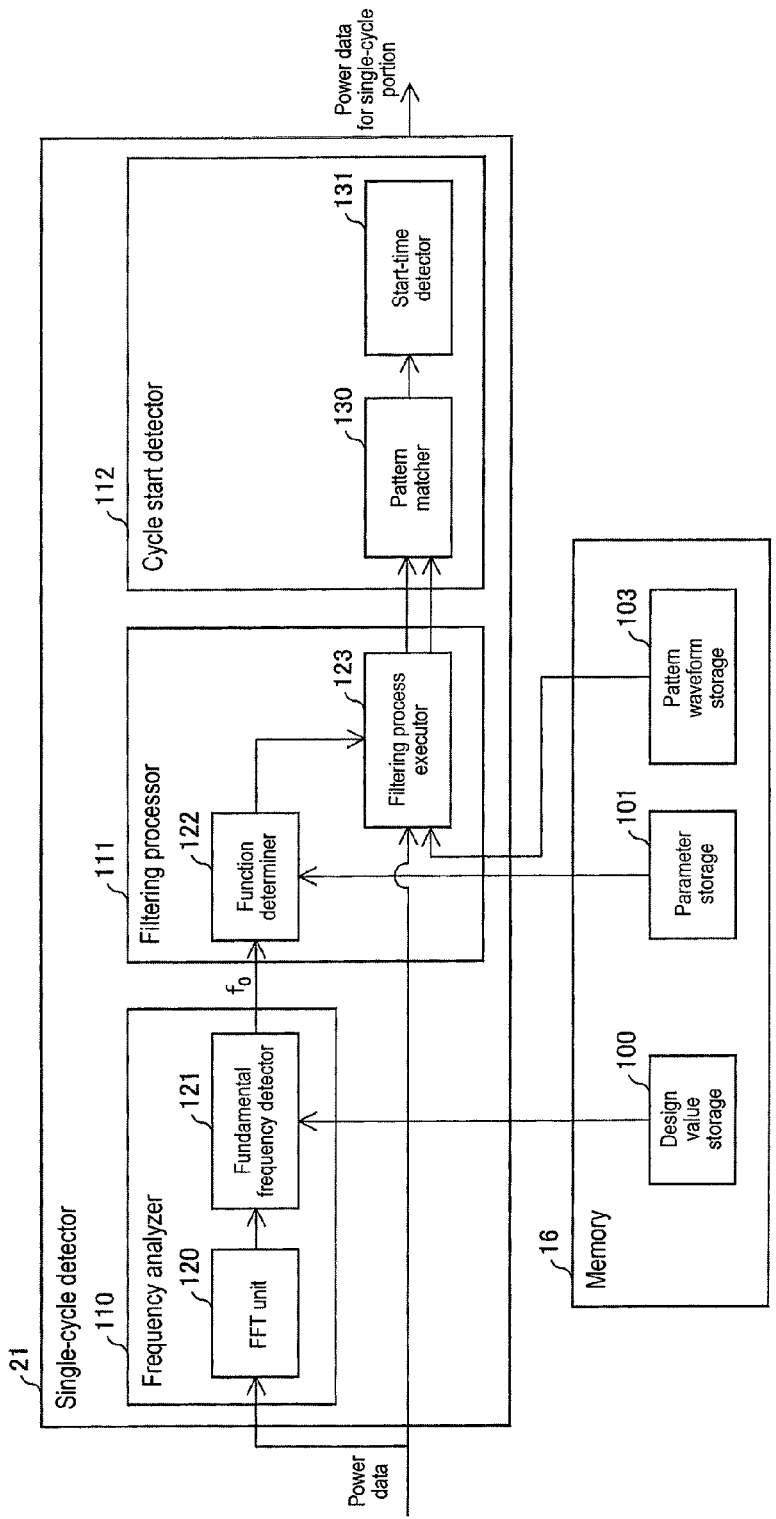
FIG. 15 A block diagram illustrating schematic configurations of a single-cycle detector and a memory that stores data used by the single-cycle detector according to an embodiment of the present invention.

Next, another embodiment of the present invention is described with reference to FIGS. 15 to 17. FIG. 15 illustrates a schematic configuration of an single-cycle detector 21 included in a power waveform analyzer 13, and a memory 16 that stores data used by the single-cycle detector 21, in an operation information output device 1 according to the present embodiment.

The operation information output device 1 of the present embodiment is different from the operation information output device 1 shown in FIGS. 8 to 14 in terms of an operation of the cycle start detector 112 of the single-cycle detector 21; and in that the memory 16 has a pattern waveform storage 103 instead of the condition storage 102. Components similar to those described in the above embodiments are provided with the same numerical references, and illustration thereof is omitted.

The pattern waveform storage 103 stores pattern waveform information that indicates a waveform of single-cycle power data.

The single-cycle detector 21 of the present embodiment detects single-cycle power data by detecting a starting point of a single-cycle out of power data by use of the design cycle time value $D_{ct}$, a frequency analysis, and pattern matching. As shown in FIG. 15, the cycle start detector 112 of the single-cycle detector 21 includes a pattern matcher 130 and a start time detector 131.

The pattern matcher 130 performs the pattern matching (template matching) on the filtered power data acquired from the power data storage 30 via the filtering process executor 123, by use of the filtered power data in a pattern waveform acquired from the pattern waveform storage 103 via the filtering process executor 123.

As a result of the pattern matching, the pattern matcher 130 identifies a portion of the filtered power data that most resembles (matches) the filtered power data in the pattern waveform. Then, the pattern matcher 130 detects a starting point of the identified portion as a reference starting point of a single-cycle. The pattern matcher 130 transmits the detected reference starting point of a single-cycle to the start time detector 131. In the present embodiment, the degree of matching (evaluation standard) is expressed in a correlation coefficient, however, it is also possible to express the degree in the form of known evaluation standards, such as convolution integral.

Figure 16:
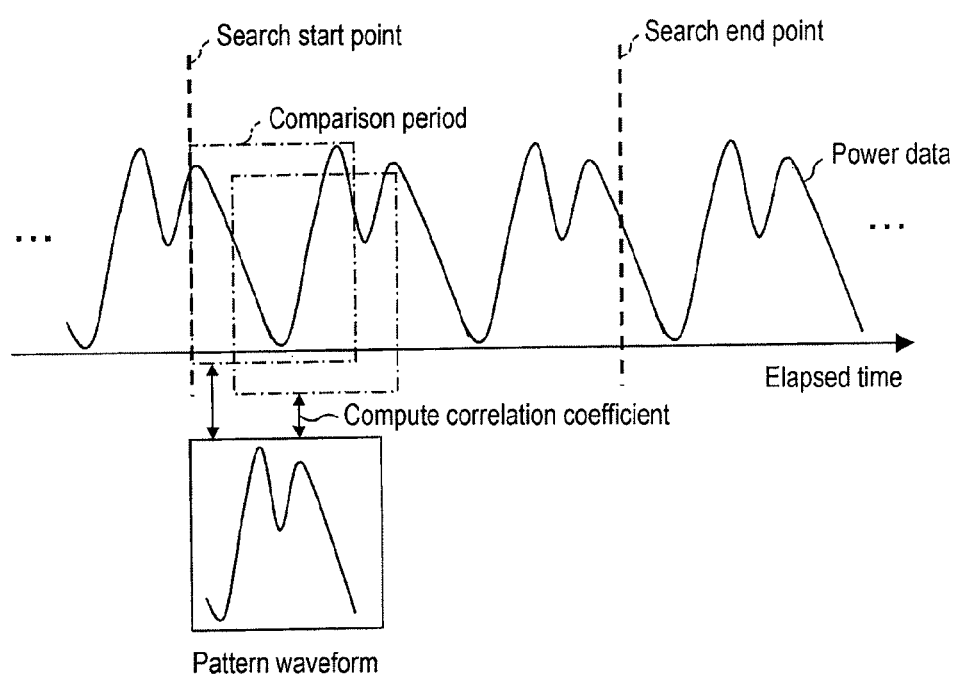
FIG. 16 A chart illustrating details of pattern matching according to the embodiment of the present invention.
Figure 17:
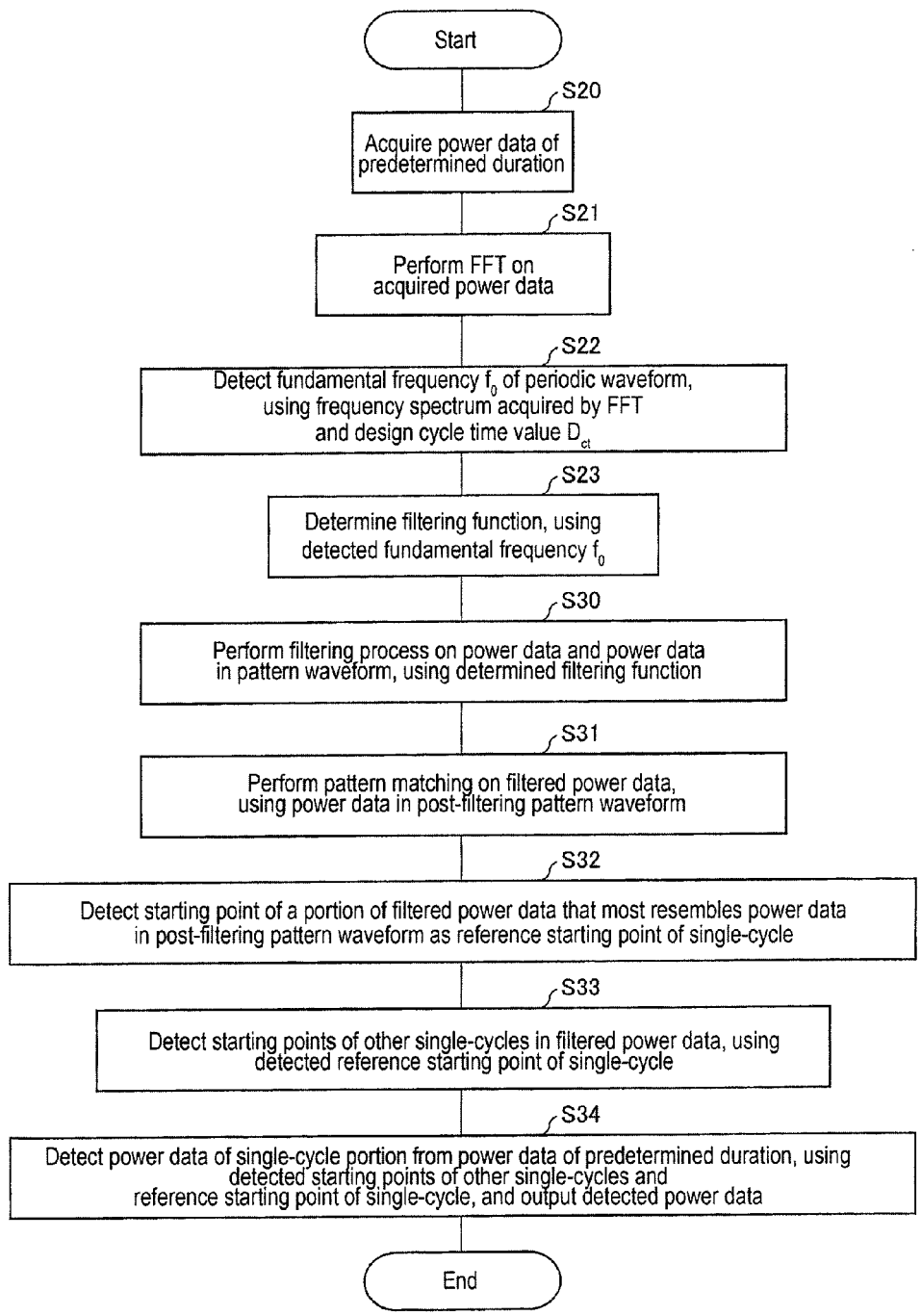
FIG. 17 A flowchart schematically illustrating a processing operation of the single-cycle detector according to the embodiment of the present invention.

FIG. 16 is a chart illustrating details of the pattern matching. The upper graph in FIG. 16 illustrates a temporal fluctuation in filtered power data. Dashed-dotted lines in the drawing each indicate a comparison period. The lower graph in FIG. 16 illustrates a filtered power data in a pattern waveform. The comparison period is the same as the duration of the filtered power data in the pattern waveform.

As shown in FIG. 16, in the present embodiment, first, a search starting point is set at a predetermined point in time, and then a comparison period is set on the downstream side of the search starting point. Next, a correlation coefficient is computed between the power data of the set comparison period and the power data in the pattern waveform.

Next, the same process as the above is repeatedly performed while shifting the comparison period to the downstream side until the starting point of the comparison period reaches the search ending point. The starting point of the comparison period having a largest correlation coefficient is determined as a reference starting point of a single-cycle. The determined reference starting point of a single-cycle is transmitted to the start time detector 131.

The search starting point may be a beginning of the filtered power data, or may be the center thereof. The comparison period may be shifted to the upstream direction, or to the downstream direction. The length of the period from the search starting point to the search ending point may depend on the design cycle time value $D_{ct}$, for example, twice the length of the design cycle time value $D_{ct}$, or may be a fixed length. The comparison period may be shifted for every power value, or may be shifted for every group of power values.

The start time detector 131 detects starting points of other single-cycles of filtered power data by use of a reference starting point of a single-cycle received from the pattern matcher 130. The single-cycle detector 21 can detect power data for a single-cycle portion by use of the reference starting point of the single-cycle detected by the pattern matcher 130, and the starting point of the single-cycle detected by the start time detector 131.

The following two methods may be considered as methods, with which the start time detector 131 detects starting points of the other single-cycles. The first method employs the fundamental period $T_0$, which is a reciprocal of the fundamental frequency $f_0$, detected by the fundamental frequency detector 121. In this method, the above-described reference starting point of a single-cycle is set as an origin. A point separated by fundamental period $T_0$ from the origin and subsequent points separated by fundamental period $T_0$ are detected as the starting points of the other single-cycles. Instead of the fundamental period $T_0$, a predetermined period corresponding to a cycle time, such as the design cycle time value $D_{ct}$, may be used.

The second method sets a search starting point and a search ending point, respectively, before and after the starting point of the single-cycle detected by the first method. Then, the second method transmits them to the pattern matcher 130 so as to receive, from the pattern matcher 130, the reference starting point of the single-cycle from the search starting point to the search ending point. Compared with the first method, the second method requires a larger amount of process, but can detect a starting point of a single-cycle with increased accuracy.

It is preferable that the search starting point be a little earlier than the starting point of the single-cycle (0.1 times of the fundamental period $T_0$ or the like, for example). In addition, it is preferable that the search ending point be a point passed a predetermined period (fundamental period $T_0$, the design cycle time value $D_{ct}$ and the like, for example) from the search starting point.

Next, a processing operation in the single-cycle detector 21 of the operation information output device 1 having the above configuration is described with reference to FIG. 17. FIG. 17 schematically illustrates the processing operation of the single-cycle detector 21. The process from the acquisition of the power data of predetermined duration from the power data storage 30 (S20) to the determination of the filtering function by the function determiner 122 (S23) is the same as those in FIG. 14, thus the illustration thereof is omitted.

After step S23, the filtering process executor 123 performs a filtering process on the power data and the power data in a pattern waveform acquired from the pattern waveform storage 103 by use of the determined filtering function (S30). Next, the pattern matcher 130 performs pattern matching on the filtered power data by use of power data in a post-filtering pattern waveform (S31). Using the result of the pattern matching, the pattern matcher 130 detects a starting point of a portion of the filtered power data that most resembles the power data in a post-filtering waveform as a reference starting point of a single-cycle (S32).

Next, the start time detector 131 detects starting points of other single-cycles in the filtered power data by use of the detected reference starting point of the single-cycle (S33). Then, using the detected stating points of the other single-cycles and reference starting point of the single-cycle, the single-cycle detector 21 detects power data for a single-cycle portion from the power data of predetermined duration acquired from the power data storage 30, and outputs the detected power data (S34). Thereafter, the processing operation is completed.

The pattern waveform storage 103 may store post-filtering pattern waveform information. In such a case, the pattern matcher 130 can directly acquire, from the pattern waveform storage 103, the post-filtering pattern waveform information. It is preferable that the filtering process performed on the pattern waveform information be the same as the filtering process performed by the filtering process executor 123.

Fifth Embodiment

Next, another embodiment of the present invention is described with reference to FIGS. 18 and 19. An operation information output device 1 of the present embodiment is different from the operation information output device 1 shown in FIGS. 15 to 17 in that the power waveform analyzer 13 is further provided with a pattern waveform generator 113. Components having functions similar to those described in the previous embodiments are provided with the same numerical references, and illustration thereof is omitted.

Figure 18:
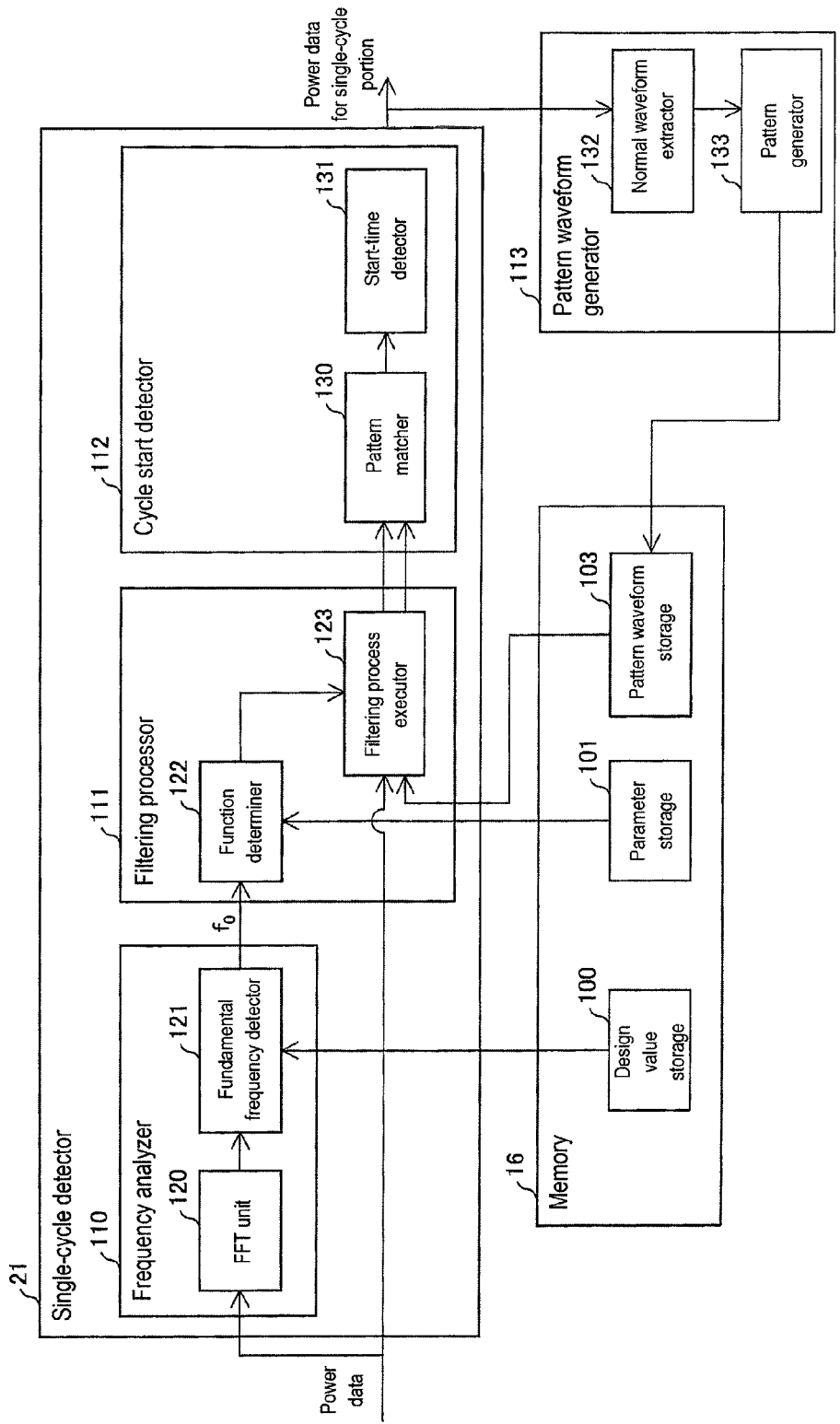
FIG. 18 A block diagram illustrating schematic configurations of the single-cycle detector, a pattern waveform generator, and a memory that stores data used by the single-cycle detector and the pattern waveform generator according to an embodiment of the present invention.

FIG. 18 illustrates schematic configurations of the single-cycle detector 21 and the pattern waveform generator 113 included in the power waveform analyzer 13, and the memory 16 that stores data used by the single-cycle detector 21 and the pattern waveform generator 113, in the operation information output device 1 of the present embodiment. The single-cycle detector 21 is the same as the single-cycle detector 21 shown in FIG. 15, thus the illustration thereof is omitted.

The pattern waveform generator 113 generates a pattern waveform of single-cycle power data by use of single-cycle power data detected by the single-cycle detector 21. As shown in FIG. 18, the pattern waveform generator 113 includes a normal waveform extractor 132 and a pattern generator 133.

The normal waveform extractor 132 receives single-cycle power data from the single-cycle detector 21, and extracts power data having a normal waveform from the received single-cycle power data. Hereinafter, single-cycle power data having a normal waveform is referred to as a normal waveform data. The normal waveform extractor 132 transmits the extracted normal waveform data to the pattern generator 133.

A method, with which the normal waveform extractor 132 determines whether or not a waveform is normal, is described. First, one or more feature amounts Fi, which characterize a single-cycle waveform, are selected in advance. In this embodiment, a cycle time F1 and total power of a single-cycle F2 are used as the feature amount Fi. Other examples of the feature amount Fi include basic statistical measurements, specifically, an average, a variance, a standard deviation, a root means square, a maximum value, a minimum value, a kurtosis, a skewness, and the like. The kurtosis indicates a degree of peakedness of a distribution of electric power in a single-cycle with respect to a normal distribution. The skewness indicates a degree of asymmetry of a distribution of electric power in a single-cycle with respect to a normal distribution.

Next, the feature amount Fi is computed for each of the received single-cycle power data. From a set of the computed feature amount Fi, a median mdi and a standard deviation sdi are computed. This process is repeated for each of the feature amount Fi.

Then, single-cycle power data is extracted as a normal waveform data when all the feature amounts Fi of the power data meets the following condition. The condition is that an absolute value abs (Fi−mdi), which is an absolute value of difference between the feature amount Fi and the median mdi, is smaller than a standard deviation sdi. Thereafter, the extracted data is transmitted to the pattern generator 133. In this embodiment, single-cycle power data that satisfies the following condition is extracted:

$$\text{abs}(F1-md1)<sd1, \text{ and } \text{abs}(F2-md2)<sd2.$$

The pattern generator 133 generates a pattern waveform by use of a plurality of normal waveform data transmitted from the normal waveform extractor 132. More specifically, the pattern generator 133 extracts power values from the plurality of normal waveform data at timing when a same amount of time has elapsed from respective starting points. Then, the pattern generator 133 calculates a median of the extracted plurality of electric power values. The computed median is determined as a power value of a pattern waveform for the elapsed time. A pattern waveform is generated by repeating the above process for all the elapsed time. The pattern generator 133 stores the generated pattern waveform data in the pattern waveform storage 103.

Next, a processing operation in the pattern waveform generator 113 of the operation information output device 1 in the above configuration is described with reference to FIG. 19. FIG. 19 schematically illustrates the processing operation of the pattern waveform generator 113.

Figure 19:
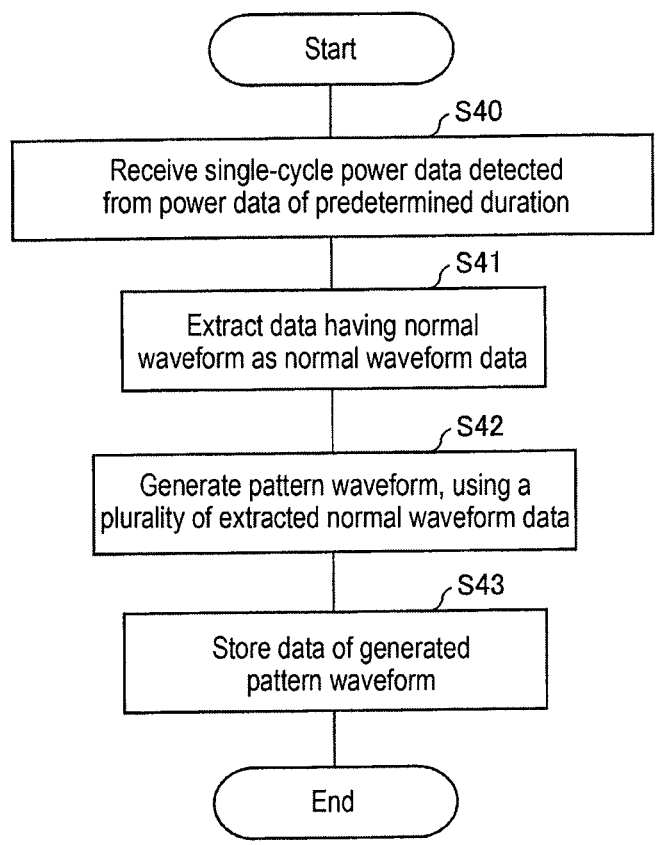
FIG. 19 A flowchart schematically illustrating a processing operation of the pattern waveform generator according to the embodiment of the present invention.
Figure 20:
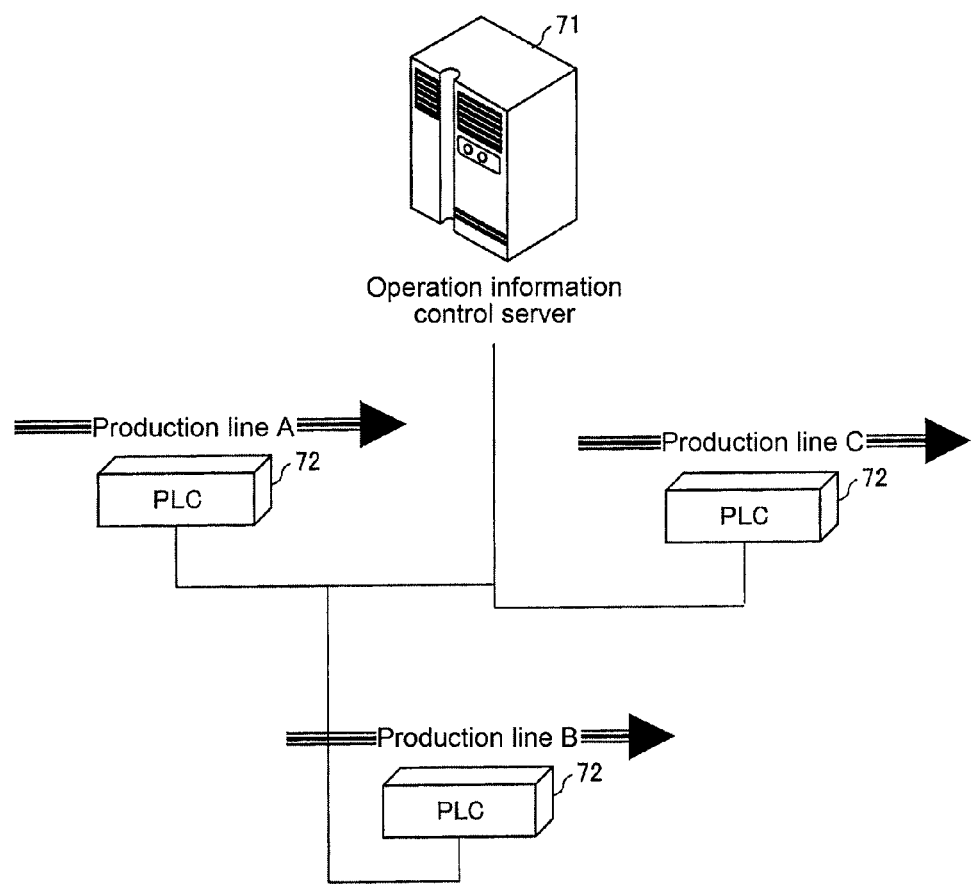
FIG. 20 An explanatory diagram illustrating a method that acquires operation information with a conventional technology.

As shown in FIG. 19, first, the normal waveform extractor 132 receives single-cycle power data detected by the single-cycle detector 21 from the power data of predetermined duration (S40), and then extracts power data having a normal waveform as normal waveform data (S41). Next, the pattern generator 133 generates a pattern waveform by use of a plurality of the extracted normal waveform data (S42), and stores the generated pattern waveform data in the pattern waveform storage 103 (S43). Then, the processing operation is completed.

Thus, in the present embodiment, an appropriate pattern waveform can be automatically acquired even when a pattern waveform is not known in advance.

The single-cycle power data received by the pattern waveform generator 113 may be data filtered by the filtering processor 111, or may be unfiltered data. The pattern waveform generator 113 may use single-cycle power data detected by other detection methods.

Sixth Embodiment

Another embodiment of the present invention is described with reference to FIGS. 2, 4, and 21 to 28. As a matter of convenience for a description, components having functions similar to those described in the previous embodiments are provided with the same numerical references, and illustration thereof is omitted. First, an entire configuration of the present embodiment is described with reference to FIG. 23. FIG. 23 is an explanatory diagram illustrating a relationship among a monitoring device 201, power meters 2, and production equipment 3 according to the present embodiment. As shown in FIG. 23, in the present embodiment, a plurality of production equipment 3 is provided in a production line 205. The power meters 2 that measure electric energy provided to each piece of the plurality of production equipment 3 are connected to the monitoring device 201. Examples of the production equipment 3 include a press machine, an injection molding machine, a washer, and the like.

The monitoring device 201 monitors the production equipment 3. In the present embodiment, the monitoring device 201 acquires a cycle time by analyzing a waveform of power consumed by the production equipment 3 and acquired from the power meter 2. Based on the acquired cycle time, the monitoring device 201 determines whether or not maintenance should be performed on the production equipment 3.

Figure 21:
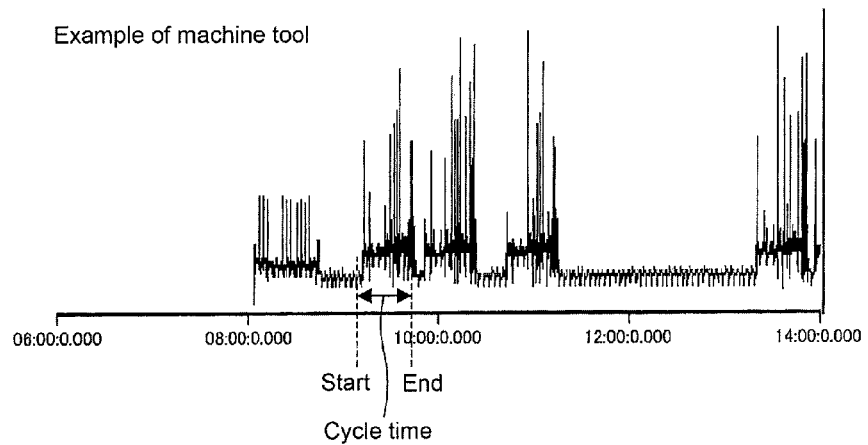
FIG. 21(a) A chart illustrating an example of a temporal fluctuation in power consumption by production equipment.
FIG. 21(b) A chart illustrating an example of a temporal fluctuation in power consumption by production equipment.
Figure 21:
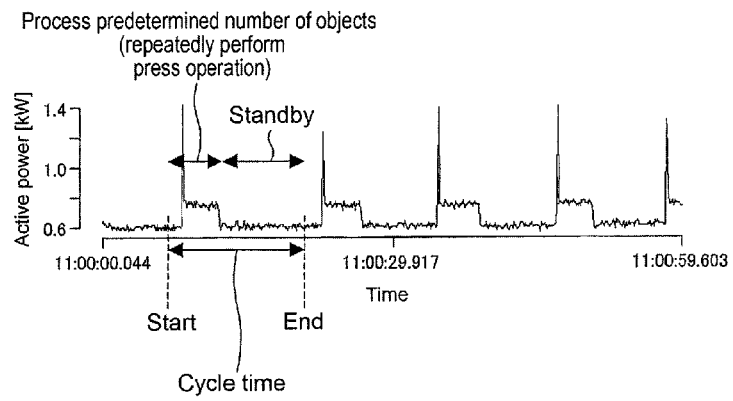

Herein, as described above, a cycle time is an amount of time required for one process of repetitive processes, such as a work, a task or a job, and is a unit of frequency or a cycle of the process. FIG. 21 provides charts illustrating examples of temporal fluctuations in power consumed by the production equipment 3, and showing the cycle time. For example, in the case of a machine tool as shown in FIG. 21(a), one cycle time is a period from a start to an end of processing on a work (object to be produced).

In the case of a press machine, process time spent to process one work is very short (0.5 ms, for example). As shown in FIG. 21(b), however, when a press operation is repeatedly performed on the predetermined number of products, followed by a predetermined stand-by period, it is possible to consider that a set of the above repetitive press operation and stand-by period is repeatedly performed. Therefore, a period from a start of the press operation to an end of the stand-by period can be regarded as a single-cycle.

The monitoring device 201 determines whether or not the maintenance should be performed based on the cycle time. Thus, the monitoring device 201 can determine timing of the maintenance from an aspect of improving production. In addition, the monitoring device 201 can determine the above, based only on the power consumption of the production equipment 3 acquired by the power meter 2. Accordingly, it is not necessary to modify a ladder program of a conventional PLC, or to introduce a new PLC. Therefore, the determination can be easily made.

Figure 22:
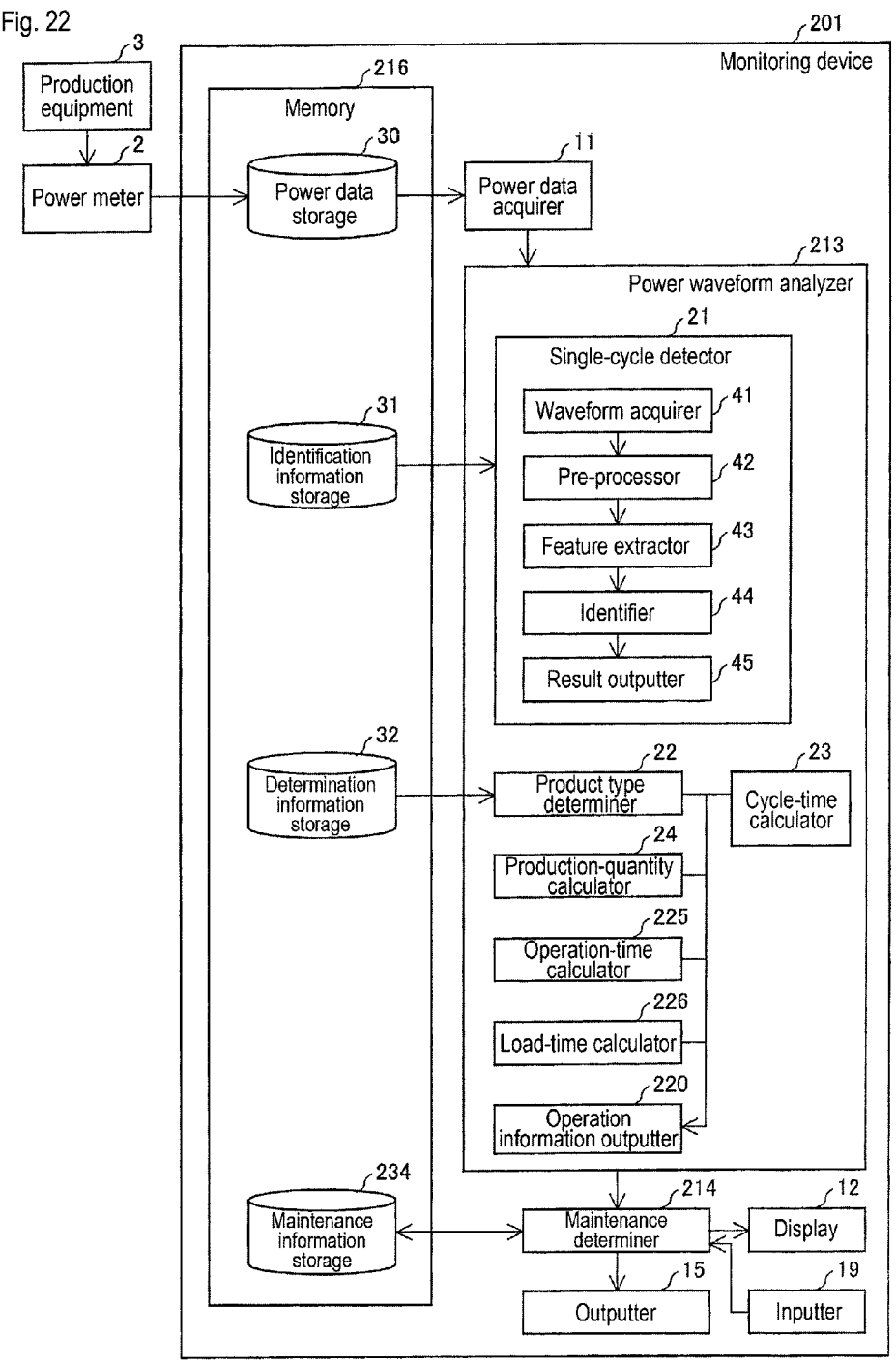
FIG. 22 A block diagram illustrating a configuration of main components of a monitoring device according to an embodiment of the present invention.
Figure 23:
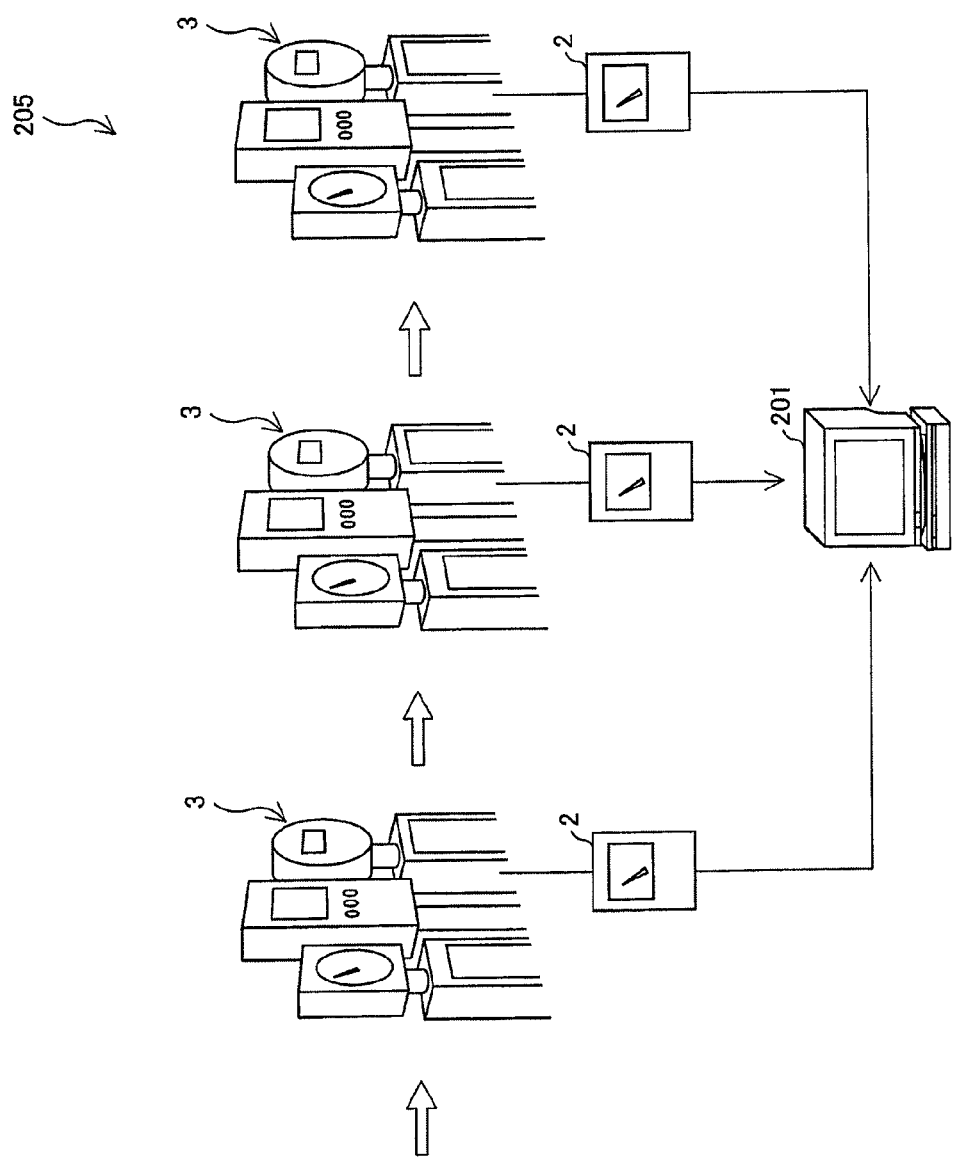
FIG. 23 An explanatory diagram illustrating a relationship among the monitoring device, power meter, and production equipment according to the embodiment of the present invention.

FIG. 22 is a block diagram illustrating a configuration of main components of a monitoring device 201 according to the present embodiment. As shown in the FIG. 22, the monitoring device 201 includes the power data acquirer 11, the display 12, the power waveform analyzer 213, a maintenance determiner 214, the outputter 15, a memory 216, and an inputter 19.

The memory 216 stores information and is configured with a nonvolatile memory, such as a flash memory, ROM (Read Only Memory), or the like, and a volatile memory, such as a RAM (Random Access Memory). In the present embodiment, the memory 216 includes the identification information storage 31, the determination information storage 32, a maintenance information storage 234, and the power data memory 30.

The power data storage 30 stores electric energy (total power consumption) that the production equipment 3 has consumed, and power (power consumption) that the production equipment 3 is consuming. Specifically, the power data storage 30 stores power data that is time-series data of power value measured by the power meter 2. The power data also includes time of measurement for each power value and/or for each predetermined period. Further, a physical quantity that can compute the power value may be stored instead of the power value.

The maintenance information storage 234 stores various pieces of information required for determining timing of maintenance on the production equipment 3. The various pieces of information are described in detail later.

The power data acquirer 11 acquires power data stored in the power data storage 30. The power data acquirer 11 transmits the acquired data to the power waveform analyzer 213.

The power waveform analyzer 213 analyzes power data (waveform) acquired from the power data acquirer 11, and acquires operation information. More specifically, the power waveform analyzer 213 includes the single-cycle detector 21, the product type determiner 22, the cycle-time calculator 23, the production-quantity calculator 24, an operation-time calculator 225, a load-time calculator 226, and an operation information outputter 220. The product type determiner 22 determines a type of product produced by the production equipment 3, using a feature of a single-cycle portion detected by the single-cycle detector 21 and determination information stored in the determination information storage 32.

The product type determiner 22 determines a type of product processed by the production equipment 3 using a feature of a single-cycle portion detected by the single-cycle detector 21 and determination information stored in the determination information storage 32.

Figure 24:
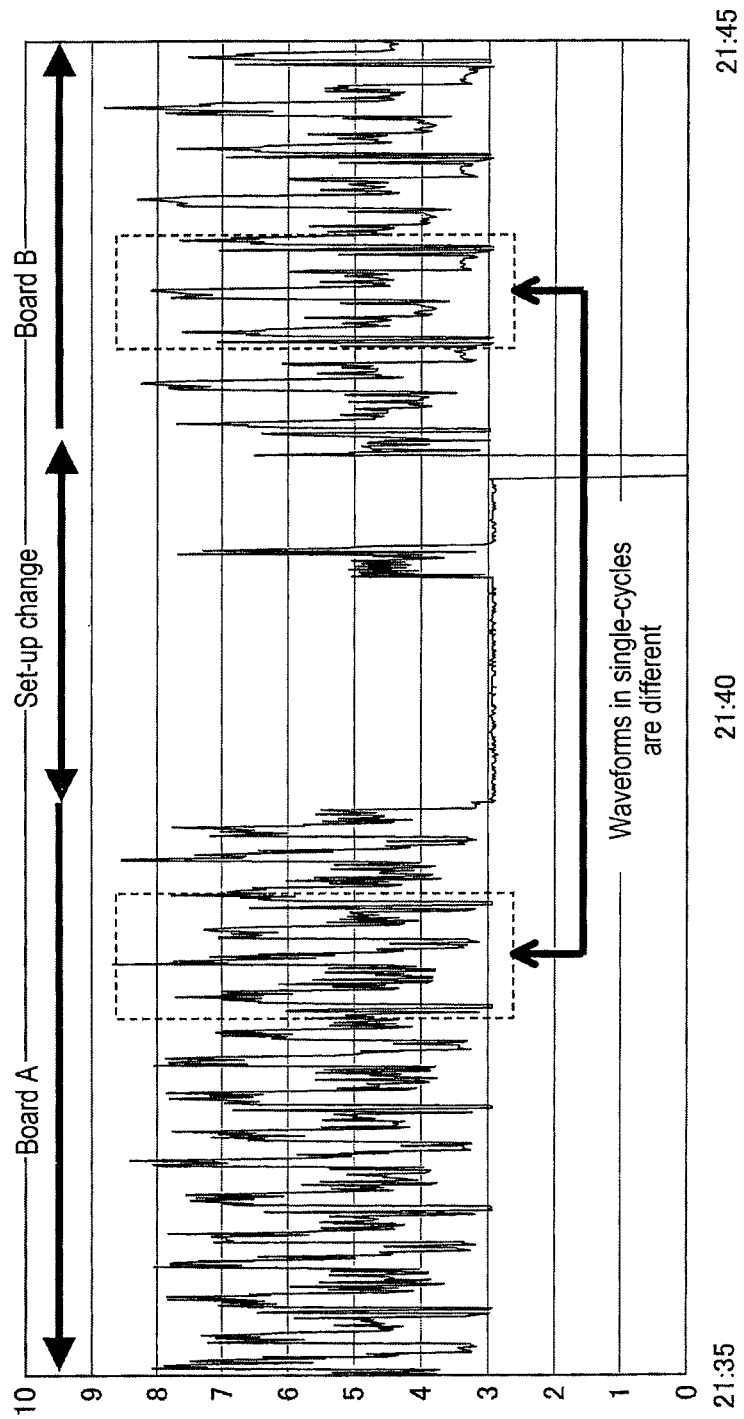
FIG. 24 A diagram illustrating a waveform of power consumption in a case where duration of a single-cycle is different depending on product types of production objects according to the embodiment of the present invention.

In general, when different types of production objects are produced, waveforms of single-cycle power data are more likely to be different. FIG. 24 illustrates power data (in a load state) of a mounter, which is the production equipment 3 that mounts an electronic component onto a printed board. In the example shown in FIG. 24, mounting an electronic component onto a type of board A is repeatedly performed after a set-up change. Thereafter, mounting an electronic component onto another type of board B is repeatedly performed. In FIG. 24, an area enclosed in broken lines is power data for a single-cycle. FIG. 24 shows that waveforms of single-cycle power data are different depending on types of boards.

Thus, with feature information of a waveform of single-cycle power data for each product type being stored in the determination information storage 32 as determination information, the product type determiner 22 can determine a product type of a production object.

The load-time calculator 226 calculates load-time, which is duration of a load-state, within a predetermined period. The operation-time calculator 225 calculates operation-time, which is duration of an operation-state, within a predetermined period.

During the load-time, power is supplied to the production equipment 3. Thus, the load-time calculator 226 can calculate the load-time, using power data acquired from the power data storage 30 via the power data acquirer 11.

During the operation-time, the production equipment 3 is in an operation-state. During the stop-time, which is duration of a stop-state, the production equipment 3 is in a stand-by state. Thus, the operation-time calculator 225 can calculate the operation-time by integrating the cycle-time calculated by cycle-time calculator 23. Alternatively, the operation-time calculator 225 can calculate the operation-time by multiplying the cycle time by a production quantity calculated by the production-quantity calculator 24. By contrast, the production-quantity calculator 24 can calculate the production quantity by dividing operation-time calculated by the operation-time calculator 225 by cycle time calculated by the cycle-time calculator 23.

In addition, the operation-time calculator 225 can calculate the stop-time by detecting, from power data, a period during which the production equipment 3 consumes stand-by power, the power data being acquired from the power data storage 30 via the power data acquirer 11. Further, the operation-time calculator 225 can calculate the operation-time, using load-time calculated by the load-time calculator 226 and the calculated stop-time.

The operation information outputter 220 receives various pieces of operation information acquired by the product type determiner 22, the cycle-time calculator 23, the production-quantity calculator 24, the operation-time calculator 225, and the load-time calculator 226, and outputs the operation information to the maintenance determiner 214.

The maintenance determiner 214 determines whether or not a maintenance should be performed on the production equipment 3 based on the cycle time calculated by the cycle-time calculator 23. When the maintenance determiner 214 determines that the maintenance should be performed, the maintenance determiner 214 informs a user accordingly via the display 12 and the outputter 15, which are described later. Examples of an informing method include outputting as display, outputting sound, sending an email to another communication device, stopping the production equipment 3, and the like. The maintenance determiner 214 is described in detail later.

The inputter 19 accepts inputs of instructions, information, and the like from a user. The inputter 19 is configured with, for example, a key input device, such as a keyboard, a button, a pointing device, such as a mouse, and the like.

Figure 25:
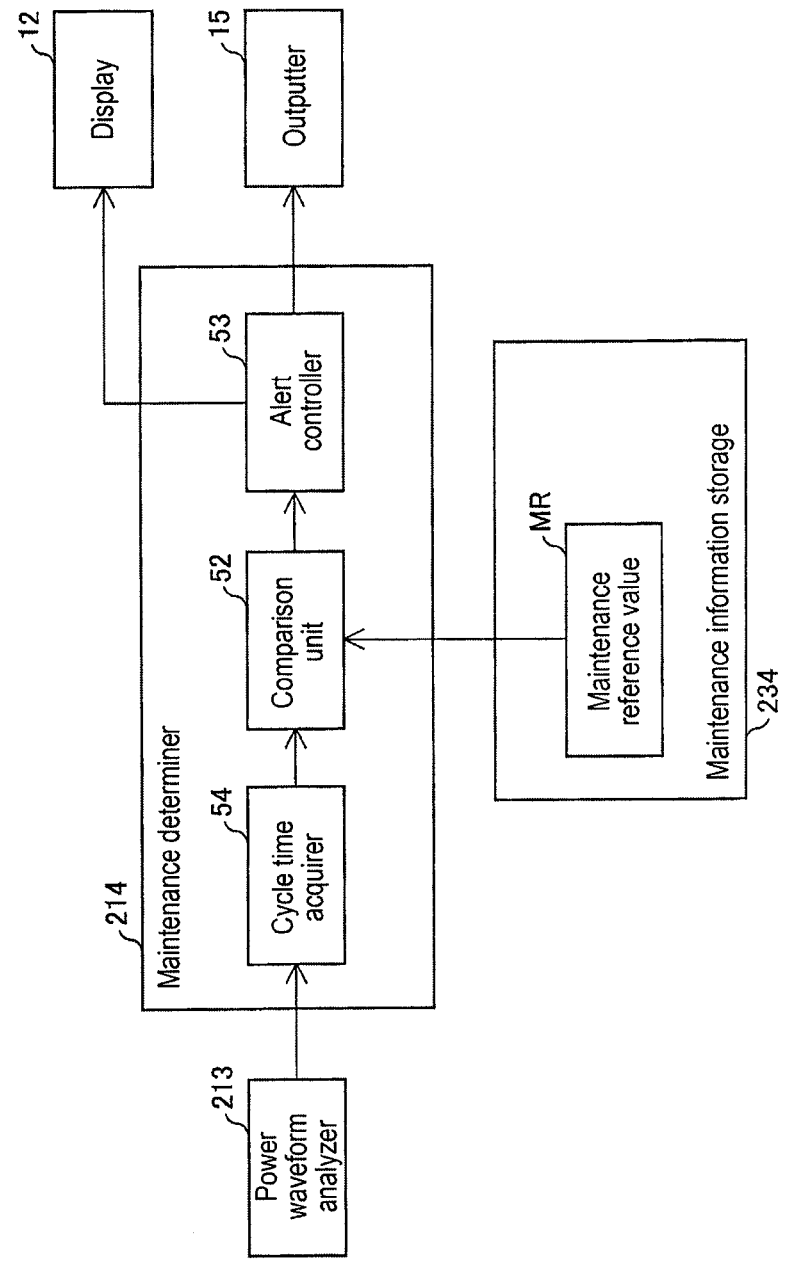
FIG. 25 A block diagram illustrating a schematic configuration of a maintenance determiner according to the embodiment of the present invention.

Next, the maintenance determiner 214 and the maintenance information storage 234 are described in detail with reference to FIGS. 25 and 26. FIG. 25 is a block diagram illustrating a schematic configuration of the maintenance determiner 214 and the maintenance information storage 234.

As shown in FIG. 25, the maintenance information storage 234 stores a predetermined maintenance reference value MR. The maintenance reference value MR is a cycle time that is used as a reference to determine whether or not maintenance should be performed. Examples of the maintenance reference value MR include a value obtained by multiplying a cycle time in the beginning or immediately after maintenance by a predetermined ratio.

The maintenance determiner 214 includes a cycle time acquirer 54, a comparison unit 52, and an alert controller 53. The cycle time acquirer 54 acquires a cycle time from the power waveform analyzer 213. The cycle time acquirer 54 transmits the acquired cycle time to the comparison unit 52.

Figure 26:
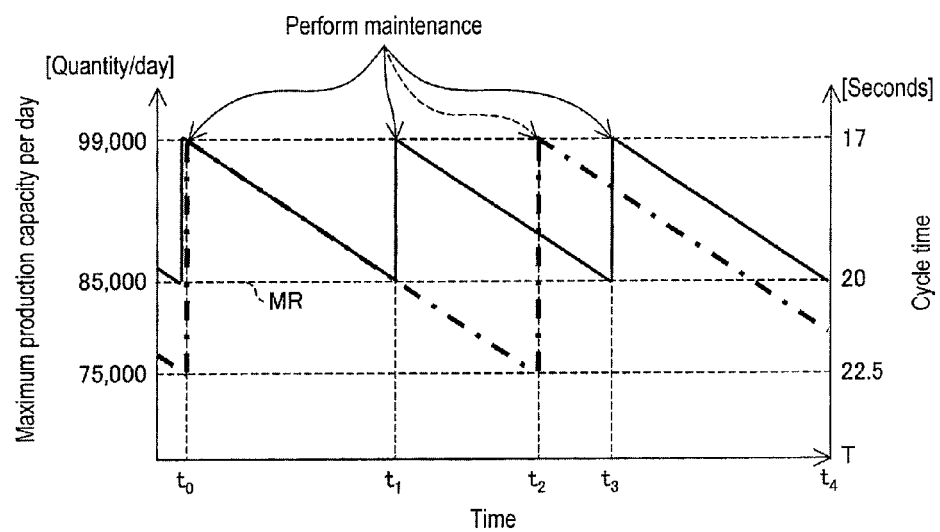
FIG. 26 A chart illustrating a temporal fluctuation in a cycle time of the production equipment according to the embodiment of the present invention.

FIG. 26 is a chart illustrating a temporal fluctuation in a cycle time of the production equipment 3. The vertical axis of the chart in FIG. 26 indicates the cycle time and a maximum production capacity (maximum value of a production quantity) per day converted from the cycle time. In FIG. 26, a graph in a solid line indicates a temporal fluctuation in the cycle time in the present embodiment. A graph in a dashed line indicates a temporal fluctuation in a conventional cycle time.

In the example shown in FIG. 26, the cycle time immediately after maintenance is 17 seconds, and the maintenance reference value MR is 20 seconds. In other words, the maintenance reference value MR is about 1.2 times as long as cycle time immediately after the maintenance.

Further, in the example of FIG. 26, both the conventional maintenance and the maintenance of the present embodiment are performed at a time $t_0$. Thereafter, as time passes by, the maintenance of the present embodiment is performed at a time $t_1$; the conventional maintenance is performed at a time $t_2$; the maintenance of the present embodiment is performed at a time $t_3$; and the maintenance of the present embodiment is performed at a time $t_4$.

As shown, an interval between the maintenances of the present embodiment is shorter than that between the conventional maintenances. This is because the present embodiment determines timing of maintenance from an aspect of preventing a decrease in productivity. By contrast, conventionally, timing of maintenance has been determined from an aspect of preventing a stoppage of the production equipment 3 due to an accident, a breakdown, or the like. Thus, conventionally, even when the cycle time increases and productivity decreases, no maintenance is performed until the cycle time further increases and possibility of stoppage of the production equipment 3 becomes high.

As shown in FIG. 25, the comparison unit 52 compares a cycle time received from the cycle time acquirer 54 with the maintenance reference value MR received from the maintenance information storage 234. In the present embodiment, when the result of the comparison indicates that the cycle time exceeds the maintenance reference value MR, the comparison unit 52 determines that maintenance should be performed, and notifies the alert controller 53 accordingly.

Based on the notice from the comparison unit 52, the alert controller 53 controls the display 12 and the outputter 15 in order to inform a user of a necessity of the maintenance.

Figure 27:
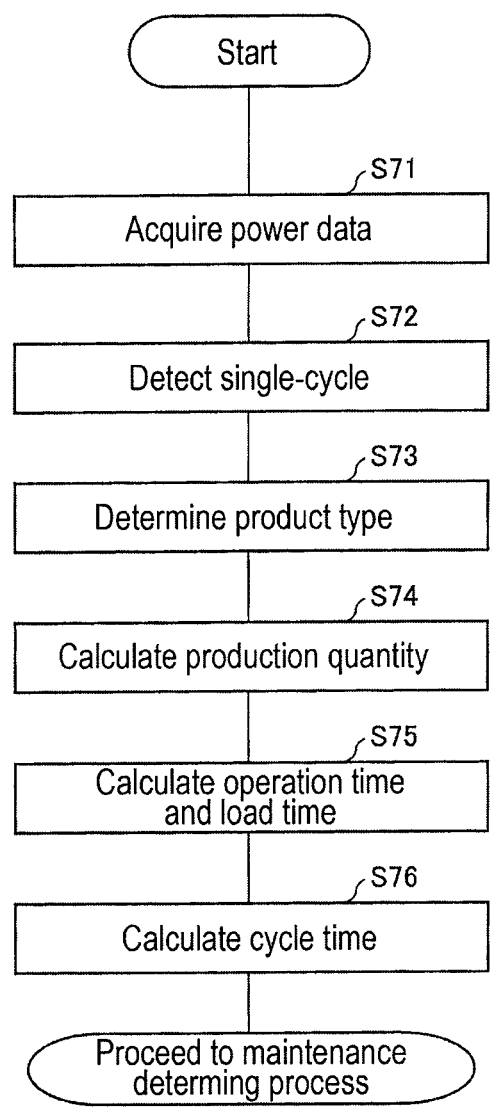
FIG. 27 A flowchart illustrating a flow of a process performed by the monitoring device to in order to calculate and determine operation information according to the embodiment of the present invention.
Figure 28:
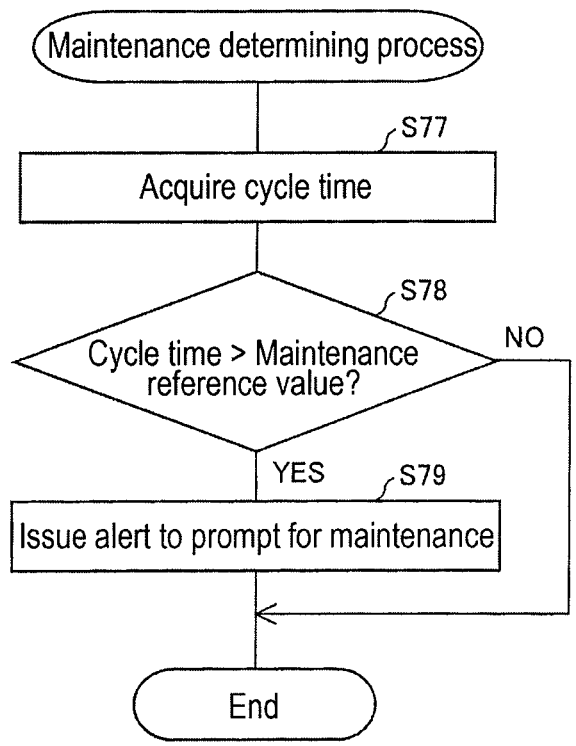
FIG. 28 A flowchart illustrating a flow of a process performed by the monitoring device in order to determine timing of maintenance according to the embodiment of the present invention.

Next, a processing operation in the monitoring device 201 having the above configuration is described with reference to FIGS. 27 and 28. FIG. 27 is a flowchart illustrating a flow of process performed by the power data acquirer 11 and the power waveform analyzer 213 of the monitoring device 201. FIG. 28 is a flowchart illustrating a flow of maintenance determining process performed by the maintenance determiner 214 of the monitoring device 201.

As shown in FIG. 27, first, the power data acquirer 11 acquires time-series power data for a period from the time of previous power data acquisition to the present time (S71). Next, the single cycle detector 21 detects a single-cycle portion from the time-series power data acquired by the power data acquirer 11 (S72). Then, the product type determiner 22 determines a product type of an object produced by the production equipment (S73). Thereafter, the production-quantity calculator 24 calculates the number of the production object processed by the production equipment 3 during the period (S74).

Next, the load-time calculator 226 calculates load-time within the period, and the operation-time calculator 225 calculates operation-time within the period (S75). Then, the cycle-time calculator 23 calculates a cycle time (S76). Thereafter, the process proceeds to the maintenance determining process shown in FIG. 28.

Next, as shown in FIG. 28, the cycle time acquirer 54 acquires the cycle time calculated in step S76 (S77). The comparison unit 52 determines whether or not the acquired cycle time is greater than the maintenance reference value MR stored in the maintenance information storage 234 (S78). When it is larger, the alert controller 53 issues an alert to prompt for maintenance by controlling the display 12 and the outputter 15 (S79). Then, the process is completed.

Seventh Embodiment

Another embodiment of the present invention is described with reference to FIGS. 29 and 30. As a matter of convenience for a description, components having functions similar to those described in the previous embodiments are provided with the same numerical references, and illustration thereof is omitted. A monitoring device 201 of the present embodiment is different from the monitoring device 201 described in the sixth embodiment in a configuration of a maintenance determiner 214.

Figure 29:
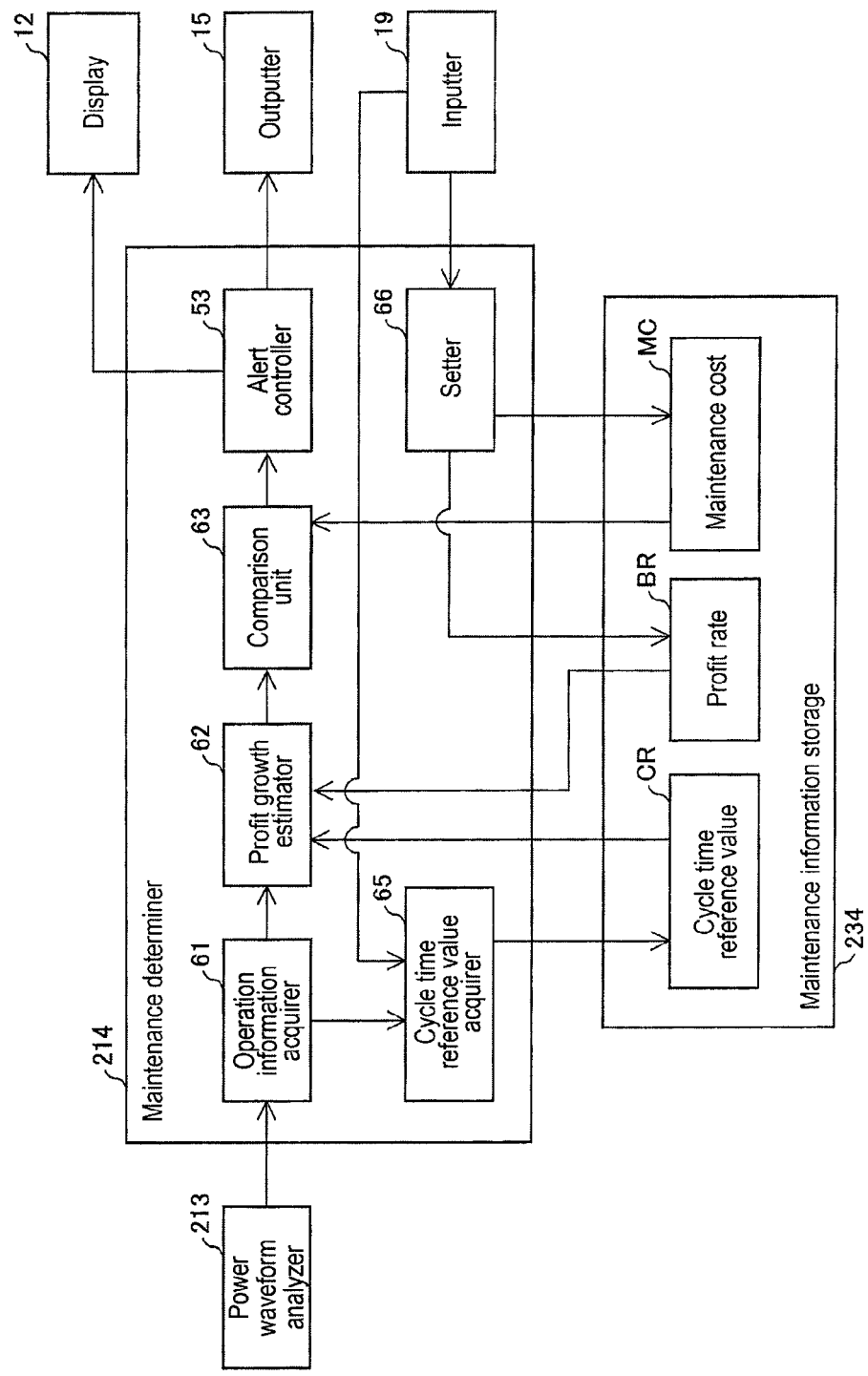
FIG. 29 A block diagram illustrating a configuration of main components of a maintenance determiner of a monitoring device according to an embodiment of the present invention.

FIG. 29 is a block diagram illustrating a configuration of main components of the maintenance determiner 214 according to the present embodiment. In the present embodiment, the maintenance determiner 214 calculates a profit growth $\Delta B$ for a case where maintenance is performed. When the integrated value of the calculated profit growth $\Delta B$ exceeds cost of the maintenance, the maintenance determiner 214 determines that the maintenance should be performed. In this case, an improvement in productivity due to the maintenance can be quantitatively evaluated as the profit growth $\Delta B$. Thus, the productivity improvement due to the maintenance and the maintenance cost can be quantitatively compared each other, thereby making it possible to accurately determine timing of the maintenance.

As shown in FIG. 29, the maintenance information storage 234 stores a cycle time reference value CR, a profit rate BR, and a maintenance cost MC. The cycle time reference value CR is a cycle time to be a reference in calculating the profit growth $\Delta B$. Specifically, the cycle time reference value CR may be cycle times in the beginning, immediately after maintenance, and the like. The profit rate BR indicates profit per product. The maintenance cost MC is a cost required for the maintenance, including costs of parts and labor. The maintenance cost MC further includes loss due to a stoppage of the production equipment 3 because of the maintenance.

The maintenance determiner 214 includes an operation information acquirer 61, a profit growth estimator 62, the comparison unit 63, the alert controller 53, a cycle time reference value acquirer 65, and a setter 66.

The operation information acquirer 61 acquires some pieces of operation information from the power waveform analyzer 213. Specifically, the operation information acquirer 61 acquires, via the operation information outputter 220, operation information such as a cycle time calculated by the cycle-time calculator 23 of the power waveform analyzer 213, a production quantity calculated by the production-quantity calculator 24, operation-time calculated by the operation-time calculator 225, and the like. The operation information acquirer 61 transmits the acquired operation information to the profit growth estimator 62. The operation information acquirer 61 transmits to the cycle time reference value acquirer 65 the acquired cycle time or a cycle time calculated from the acquired production quantity and the operation-time.

The profit growth estimator 62 estimates the profit growth $\Delta B$, using the operation information received from the operation information acquirer 61, and the cycle time reference value CR and the profit rate BR received from the maintenance information storage 234. The profit growth estimator 62 transmits the estimated profit growth $\Delta B$ to the comparison unit 63.

For example, when a cycle time CT and an operation-time OT are acquired from the operation information acquirer 61, the profit growth $\Delta B$ can be calculated using the following formula.

$$\Delta B=(OT/CR-OT/CT) \times BR \qquad (1).$$

Further, a relation among the cycle time CT, the operation-time OT, and a production quantity PN can be shown by the following formula.

$$OT=CT \times PN \qquad (2).$$

Thus, for example, when the cycle time CT and the production quantity PN are acquired from the operation information acquirer 61, the profit growth $\Delta B$ can be calculated using the following formula.

$$\Delta B=(PN \times CT/CR-PN) \times BR \qquad (3).$$

The comparison unit 63 integrates the profit growth $\Delta B$ received from the profit growth estimator 62, and compares its integrated value B with the maintenance cost MC stored in the maintenance information storage 234. In the present embodiment, when the result of the comparison indicates that the integrated value B of the profit growth exceeds the maintenance cost MC, an increased profit in accordance with an increase in productivity due to maintenance is larger than the maintenance cost MC. Thus, the comparison unit 63 determines that maintenance should be performed, and informs the alert controller 53 accordingly.

The cycle time reference value acquirer 65 acquires a cycle time immediate after maintenance from the operation information acquirer 61. It can be determined whether or not it is immediately after the maintenance, based on an operator's input indicating an execution of a maintenance acquired via the inputter 19. The cycle time reference value acquirer 65 updates the maintenance reference value MR in the maintenance information storage 234 with the acquired cycle time. Thus, by using the cycle time immediately after maintenance, it is also possible to accommodate a case where the cycle time changes due to aging degradation or the like.

The setter 66 sets the profit rate BR and the maintenance cost MC in the maintenance information storage 234 in response to the user's instruction via the inputter 19. Thus, it is also possible to accommodate a case where the profit rate BR and the maintenance cost MC change due to aging degradation or the like.

Next, a processing operation in the monitoring device 201 having the above configuration is described with reference to FIG. 30. FIG. 30 is a flowchart illustrating a flow of a maintenance determining process performed by the maintenance determiner 214 of the monitoring device 201. The processes performed by the power data acquirer 11 and the power waveform analyzer 213 of the monitoring device 201 are the same as the processes shown in FIG. 27, thus the description thereof is omitted.

Figure 30:
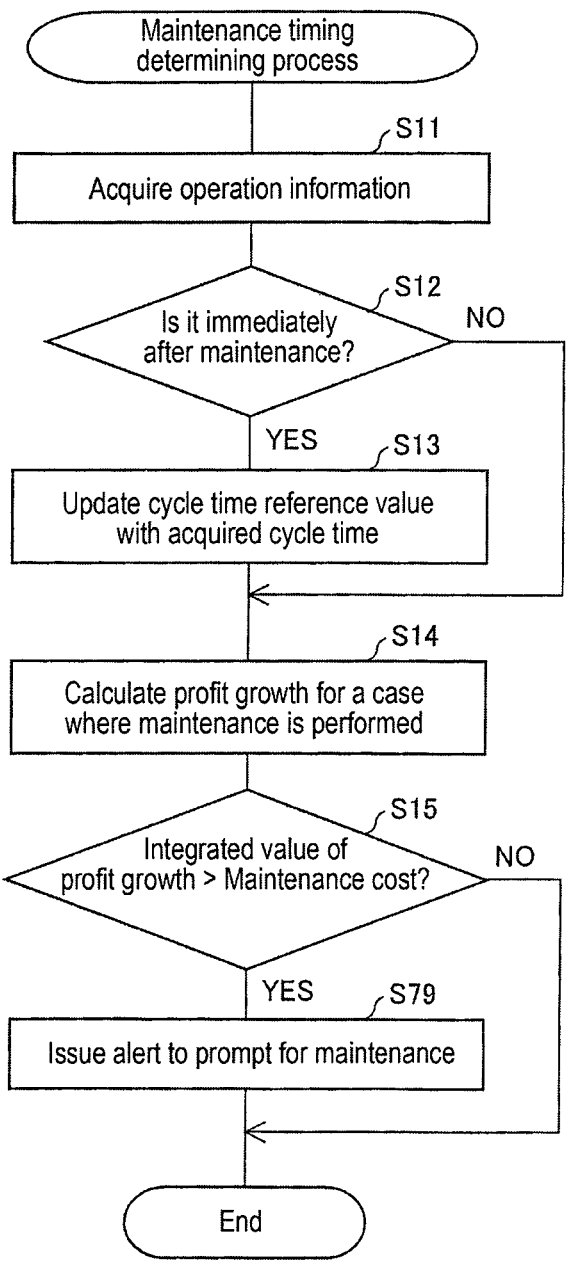
FIG. 30 A flowchart illustrating a flow of a process performed by the monitoring device in order to determine timing of maintenance according to the embodiment of the present invention.

As shown in FIG. 30, first, the operation information acquirer 61 acquires the operation information from the power waveform analyzer 213 (S11). Then, the cycle time reference value acquirer 65 determines whether or not it is immediately after maintenance based on input information received from the inputter 19 (S12). When it is immediately after maintenance, the cycle time reference value acquirer 65 updates the cycle time reference value CR in the maintenance information storage 234 with the cycle time acquired or calculated by the operation information acquirer 61 (S13).

Next, the profit growth estimator 62 calculates the profit growth ΔB for a case where maintenance is performed, based on the above-described formula (1) or formula (3) using operation information acquired by the operation information acquirer 61 (S14). Next, the comparison unit 63 determines whether or not the integrated value B of the calculated profit growth ΔB is greater than the maintenance cost MC in the maintenance information storage 234 (S15). When it is greater, the alert controller 53 issues an alert to prompt for maintenance by controlling the display 12 and the outputter 15 (S79). Then, the process is completed.

Eighth Embodiment

Figure 31:
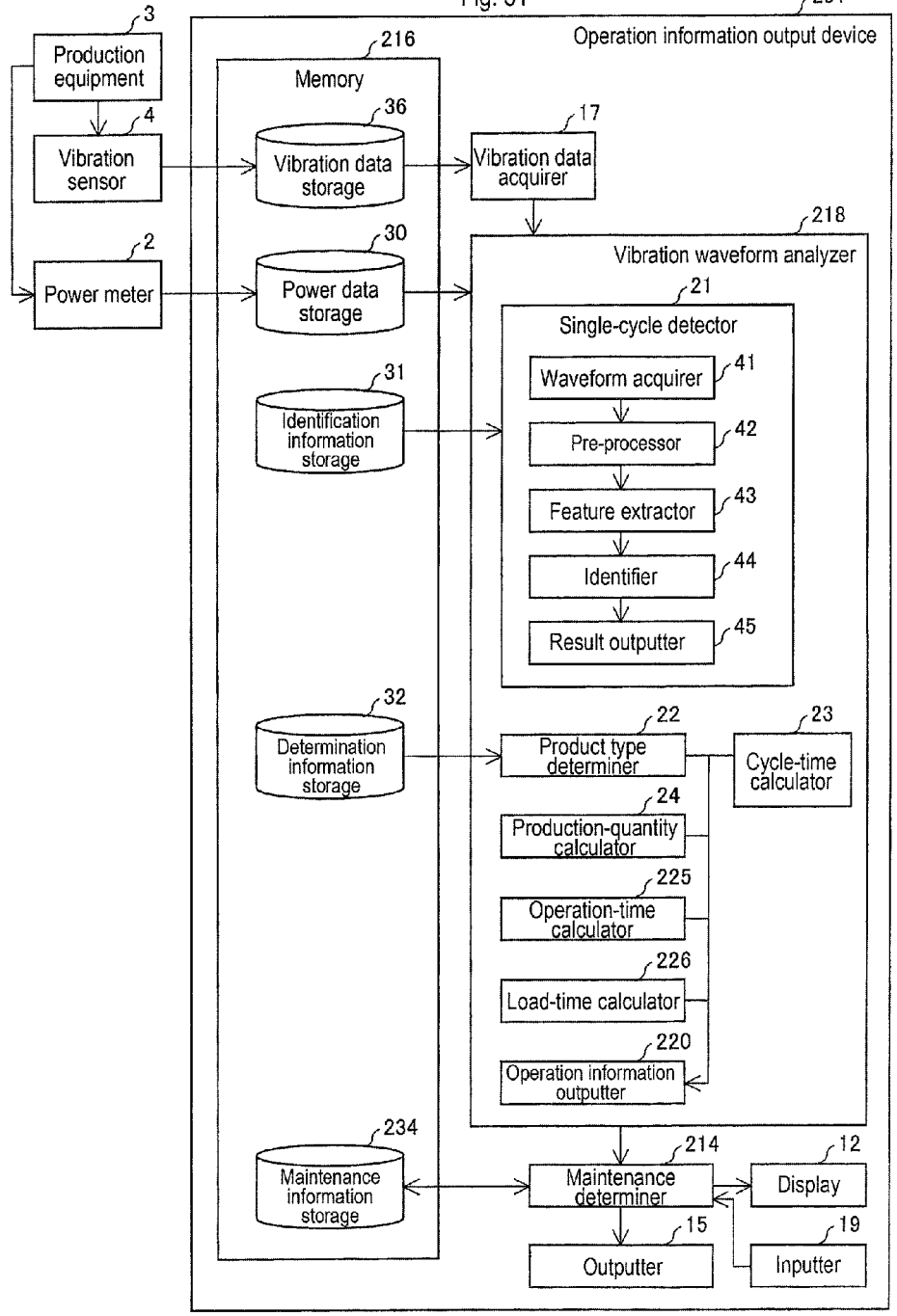
FIG. 31 A block diagram illustrating a configuration of main components of a monitoring device according to an embodiment of the present invention.

Another embodiment of the present invention is described with reference to FIG. 31. As a matter of convenience for a description, components having functions similar to those described in the previous embodiments are provided with the same numerical references, and illustration thereof is omitted. FIG. 31 is a block diagram illustrating a configuration of main components of a monitoring device 201 according to the present embodiment.

The present embodiment is different from the sixth embodiment in that, instead of time-series power data, time-series vibration data, which is an amount of displacement of the production equipment 3, is used to calculate and determine operation information. Thus, the present embodiment includes a vibration sensor 4 provided to the production equipment 3, a vibration data storage 36 provided to the memory 16, and a vibration data acquirer 17. Further, the present embodiment includes a vibration waveform analyzer 218 instead of the power waveform analyzer 213.

The vibration waveform analyzer 218 analyzes the time-series vibration data (waveform) acquired from the vibration data acquirer 17, and calculates and determines operation information of the production equipment 3. The specific configuration of the vibration waveform analyzer 218 is similar to that of the power waveform analyzer 213, thus description thereof is omitted. The time-series vibration data for the vibration waveform analyzer 218 corresponds to the time-series power data for the power waveform analyzer 213.

In the above embodiment, the vibration sensor 4 is used to acquire time-series data, however, a configuration is not limited to this. Time-series data acquired by a flow sensor, a temperature sensor, a humidity sensor, a sound sensor, an image sensor, a proximity sensor, a photoelectric sensor, and the like, may be used to detect a single-cycle, and then to calculate or determine operation information.

Further, each of the above sensors may be used in combination with a power meter to detect a single-cycle, and then to calculate and determine operation information.

Ninth Embodiment

Next, another embodiment of the present embodiment is described with reference to FIGS. 8 to 14. Compared with the monitoring device 201 shown in the sixth embodiment, a monitoring device 201 of the present embodiment is different in an operation of a single-cycle detector 21. Components having functions similar to those described in the previous embodiments are provided with the same numerical references, and illustration thereof is omitted.

The single-cycle detector 21 of the present embodiment employs a design cycle time value $D_{ct}$ and a frequency analysis to detect a starting point of a single-cycle of power data thereby detecting power data for the single-cycle. Herein, the design cycle time value $D_{ct}$ is a design value of a cycle time set by a responsible person in a manufacturing floor, or the like.

FIG. 8 illustrates schematic configurations of the single-cycle detector 21, and the memory that stores data used by the single-cycle detector 21. As shown in the drawing, the single-cycle detector 21 includes a frequency analyzer 110, a filtering processor 111, and a cycle start detector 112. The memory 16 includes a design value storage 100, a parameter storage 101, and a condition storage 102.

In the present embodiment, a range of frequency, in which the fundamental frequency is detected, is limited to a predetermined range including a reciprocal of design cycle time value $D_{ct}^{-1}$ stored in the design value storage 100. Thus, it is possible to successfully acquire a fundamental frequency of a periodic waveform corresponding to a cycle time.

FIG. 9 is for describing a method that detects the fundamental frequency, and illustrates an example of the frequency spectrum around the reciprocal of design cycle time value $D_{ct}^{-1}$ as a line graph. In FIG. 9, a range between broken lines is the above-described predetermined range. The fundamental frequency detector 121 detects a frequency having a strongest frequency spectrum in the range between the broken lines as a fundamental frequency $f_0$. In the present embodiment, the frequency in the predetermined range is 0.5 to 2 times of the reciprocal of design cycle time value $D_{ct}^{-1}$.

The present embodiment uses a following logistic function f(x) as a filtering function. It is also possible to use other functions as the filtering function.

$$f(x)=1/(1+\exp(s \times (x-fc)))$$

Herein, fc indicates a value of x when f=0.5, and corresponds to a cutoff frequency in the present embodiment. Further, in the present embodiment, the cutoff frequency is defined as follows:

$$fc = \text{fundamental frequency } f_0 \times \text{parameter } P_{aram}.$$

Further, "s" indicates a reduction rate of the logistic function, and is provided in a range 0≤s≤.

FIGS. 10 (a) and (b) are charts each illustrating an example of power data before and after an execution of a filtering process by the filtering process executor 123. FIGS. 11 (a) and (b) are charts each illustrating frequency spectrums for the respective power data shown in FIG. 10 (a) and (b).

FIGS. 11 (a) and (b) illustrate frequency characteristics of a logistic function, which is a filtering function, determined by the function determiner 122. In the illustrated example, $f_0 \approx 0.0573$ Hz, $P_{aram}=3$ (hence, fc=0.1719 Hz), s=0.1. In addition, FIGS. 10 and 11 illustrate examples of a case where the production equipment 3 is an injection molding machine.

A comparison between FIGS. 11 (a) and (b) shows that an execution of the filtering process removes frequency components higher than the fundamental frequency $f_0$ and also equal to or higher than 0.2 Hz. In addition, a comparison between FIGS. 10 (a) and (b) shows that an execution of the filtering process makes a cycle waveform more distinctive.

The cycle start detector 112 detects a starting point of a single-cycle. When the production equipment 3 starts a process on a work, power consumption often suddenly increases. In fact, in referring to the power data after the filtering process shown in FIG. 16 (b), it can be understood that a rise, that is, a sudden increase in a power value, periodically occurs.

Thus, when a rise of the power value after the filtering process can be detected, it is possible to detect a starting point of a single-cycle. In the present embodiment, the rise of the power value is used as a starting point of a single-cycle.

Various methods are known for determining the rise of the power value. A detection method used in the present embodiment is described with reference to FIG. 12. FIG. 12 is a chart illustrating a power data after the filtering process and second order differential of the power data. In the chart, a solid line is a graph of the power data, and a dashed line is a graph of the second order differential of the power data.

As shown in FIG. 12, a power value after the filtering process is small immediately before the rise of the power value after the filtering process. Then, the slope of the power value sharply increases from negative to positive as time passes by. Thus, the second order differential value of the power value becomes large. Thus, it is possible to determine a rising point of the power value when a condition is met, the condition being that the power value is smaller than a predetermined threshold value and the second order differential value of the power value is larger than another threshold value. For example, in FIG. 12, the locations enclosed by circles in the same line types as those of the graph lines meet the above condition. Thus, a point in time for those locations is determined as a rising point of the power value. Hereinafter, the above threshold value for the power value is referred to as a "power threshold value", and the above threshold value for the second order differential value of the power value is referred to as a "second order differential threshold value". In addition, the above condition is referred to as a "rise detection condition".

Further, additional requirements may be added to the rise detection condition. For example, even when the slope of the power value sharply increases as described above, in a case where the slope of the power value decreases immediately after that, the increase in the power value is suppressed. Thus, the increase cannot be referred to as the rise. Therefore, the rise detection condition may further include another requirement, such that the power value after a predetermined time period (e.g., five second) from the time of meeting the above condition is greater than the power threshold value.

In addition, as shown in FIG. 12, it is possible that the rise detection condition may be satisfied not only at one point in time, but also multiple points in time including the first point. Therefore, there may be a case where the above rise detection condition is satisfied at a plurality of points in time within a period equal to or shorter than 0.5 times of either one of the design cycle time value $D_{ct}$ and the fundamental period $T_0$, which is a reciprocal of fundamental frequency $f_0$. In such a case, the rise detection condition may further include a requirement, such that a rising point of the power value is determined at a point in time when the reciprocal of second order differential value of the power value is the greatest.

Next, a method that determines the power threshold value and the second order differential threshold value is described. In referring to FIG. 12, it can be understood that power values need to periodically fall under the power threshold value. Therefore, the power threshold value is determined so as to be a value that can detect the power values that periodically fall under the power threshold value.

FIG. 13 is a chart used to decide the power threshold value. In the upper part in FIG. 13, a graph indicates a temporal fluctuation in power data, and the dashed lines each indicate search periods. In the lower part in FIG. 13, medians of the predetermined number of lowest power values of the power data in each search period are shown.

As the above-mentioned predetermined number, actual number may be employed, or a formula may be employed to obtain the predetermined number. Examples of such a formula include, for example, the formula as follows:

the predetermined number=$a/(f_0 * t_{sampling})$ (where the figure below the decimal point is rounded up)

Herein, "$t_{sampling}$" represents a sampling period of data measurement. Also, "$(f_0 * t_{sampling})^{-1}$" represents the number of data for the fundamental period $T_0$ (=$1/f_0$), and "a" represents its coefficient. In the present example, "a"=0.3. For example, in a case where $f_0$=0.1719 Hz, and $t_{sampling}$=0.6 second, it is determined that the predetermined number=3. Therefore, the medians of the lowest three power values are calculated.

As shown in FIG. 13, in the present embodiment, a predetermined search period is set to be a certain time period on the upstream side. The median values are calculated for the predetermined number of the lowest power values within the power data included in the set search period. It is preferable that the search period has predetermined duration longer than the fundamental period $T_0$.

Next, the same process as described above is repeatedly performed while shifting the search period by a predetermined length of time to the downstream side. Then, an upper adjacent value of a set of the calculated median values is determined as the power threshold value. It is preferable that the predetermined length of time be shorter than the fundamental period $T_0$ and, more preferably, be about a half of the fundamental period $T_0$.

Herein, the upper adjacent value is a maximum value of data below a point, which is an upper hinge U+(H-spread h×a). The H-spread h is a distance between an upper hinge U and a lower hinge. The upper hinge is a median of data above a median of all data (75th percentile value). The lower hinge is a median of data below a median of all data (25th percentile value). The parameter "a", which typically is 1.5, is 2 in this embodiment, considering the margin to successfully detect a rise.

The second order differential threshold value can be determined by use of an approach opposite to the method that determines the power threshold value. Specifically, in referring to FIG. 12, it is understood that there are the power values need to periodically exceed the second order differential threshold value. Thus, the second order differential threshold value is determined so as to be a value that can periodically detect the power values that exceed the second order differential threshold value.

In the present embodiment, a predetermined search period is set to be a certain time period on the upstream side. The median values are calculated for the predetermined number of the highest power values within the second order differential data included in the set search period. Next, the same process as described above is repeatedly performed while shifting the search period by a predetermined length of time to the downstream side. Then, a lower adjacent value of a set of the calculated median values is determined as the second order differential threshold value. Herein, the lower adjacent value is a minimum value of data above a point, which is a lower hinge L−(H-spread h×a).

Therefore, the cycle start detector 112 determines a rise of a power value as a starting point of a single-cycle by use of power data, on which the filtering process executor 123 has performed a filtering process, and a second order differential of the power data. The cycle start detector 112 includes a second order differential arithmetic unit 124, a threshold value determiner 125, and a start time detector 126. Further, the condition storage 102 stores the above search period, the above predetermined number, the above predetermined length of time, and the parameter "a".

The second order differential arithmetic unit 124 calculates a second order differential of the filtered power data output from the filtering process executor 123. The second order differential arithmetic unit 124 transmits, to the threshold value determiner 125 and the start time detector 126, the calculated second order differential data along with the filtered power data.

The threshold value determiner 125 determines the power threshold value and the second order differential threshold value as described above, by use of the filtered power data and the second order differential data output from the second order differential arithmetic unit 124, and the search period, the predetermined number, the predetermined time length, and the parameter "a" stored in the condition storage 102. The threshold value determiner 125 transmits, to the start time detector 126, the determined power threshold value and second order differential threshold value.

The start time detector 126 detects a starting point of a single-cycle by use of the filtered power data and the second order differential data from the second order differential arithmetic unit 124, and the power threshold value and the second order differential threshold value from the threshold value determiner 125, based on the above-described rise detection condition. Thereby, the single-cycle detector 21 can detect power data of a single-cycle portion.

Next, a processing operation of the waveform analyzer 213 in the monitoring device 201 having the above configuration is described with reference to FIG. 14. FIG. 14 schematically illustrates a processing operation of the single-cycle detector 21 in the power waveform analyzer 213.

As shown in FIG. 14, the single-cycle detector 21 first acquires power data of predetermined duration from the power data storage 30 (S20). Next, the FFT unit 120 performs an FFT on the acquired power data (S21). The fundamental frequency detector 121 detects a fundamental frequency $f_0$ of a periodic waveform, by use of a frequency spectrum data acquired by performing the FFT and the design cycle time value $D_{ct}$ stored in the design value storage 100 (S22).

Next, the function determiner 122 determines a filtering function by use of the detected fundamental frequency $f_0$ and various parameters stored in the parameter storage 101 (S23). The filtering process executor 123 performs a filtering process on the power data by use of the determined filtering function (S24).

Next, the second order differential arithmetic unit 124 calculates a second order differential of the filtered power data; and then the threshold value determiner 125 determines a power threshold value and a second order differential threshold value by use of the second order differential data acquired from the calculation result, the filtered power data, and various data stored in the condition storage 102 (S25). Next, the start time detector 126 detects, based on the rise detection condition, a starting point of a single-cycle by use of the determined power threshold value and second order differential threshold value, the filtered power data, and the second order differential data (S26). Then, the single-cycle detector 21 detects power data for a single-cycle portion out of the power data of predetermined duration acquired from the power data storage 30, by use of the detected starting point of the single-cycle, and outputs the detected power data (S27). Thereafter, the processing operation is completed.

The present embodiment can detect a starting point of a single-cycle by use of power data and various set values. Thus, it is not necessary to use a pattern waveform.

The present embodiment determines a rising point of a power value as a starting point of a single-cycle. However, some types of the production equipment 3 start the processing after preparing for the processing. In this case, the starting point of the single-cycle is a starting point of the preparation. Thus, the starting point of the single-cycle deviates from the starting point of the processing, that is, the rising point of the power value. In many cases, however, the preparation period may be already known based on the operation of the production equipment 3, or power data of the preparation period may show specific characteristics. Therefore, by detecting the rising point of the power value, the starting point of the preparation, that is, the starting point of the single-cycle, can be easily acquired.

Further, similar to the detection of a rising point of a power value, a fall point of the power value may be detected.

Tenth Embodiment

Next, another embodiment of the present invention is described with reference to FIGS. 15 to 17. FIG. 15 illustrates schematic configurations of an single-cycle detector 21 included in a power waveform analyzer 213, and a memory that stores data used by the single-cycle detector 21, in a monitoring device 201 according to the present embodiment.

The monitoring device 201 of the present embodiment is different from the monitoring device 201 shown in shown in the sixth embodiment in terms of an operation of a cycle start detector 112 of the single-cycle detector 21; and in that the memory 216 has a pattern waveform storage 103 instead of the condition storage 102. Components having functions similar to those described in the previous embodiments are provided with the same numerical references, and illustration thereof is omitted.

The single-cycle detector 21 of the present embodiment detects single-cycle power data by detecting a starting point of a single-cycle from power data by use of the design cycle time value $D_{ct}$ a frequency analysis, and pattern matching. As shown in FIG. 16, the cycle start detector 112 of the single-cycle detector 21 includes a pattern matcher 130 and a start time detector 131.

The pattern matcher 130 identifies, based on a pattern matching result, a portion of the filtered power data that most resembles (matches) power data having post-filtering waveform. Then, the pattern matcher 130 detects a starting point of the identified portion as a reference starting point of a single-cycle. The pattern matcher 130 transmits the detected reference starting point of a single-cycle to the start time detector 131. In the present embodiment, the degree of matching (evaluation standard) is expressed in a correlation coefficient, however, it is also possible to express the degree in the form of known evaluation standards, such as convolution integral.

FIG. 16 is a chart illustrating details of the pattern matching. The upper graph in FIG. 16 illustrates a temporal fluctuation in filtered power data. Dashed-dotted lines in the drawing each indicate comparison periods. The lower graph in FIG. 16 illustrates a filtered power data in a pattern waveform. The comparison period is the same as the duration of the power data in the pattern waveform.

As shown in FIG. 16, in the present embodiment, first, a search starting point is set at a predetermined point in time, and then a comparison period is set on the downstream side of the search starting point. Next, a correlation coefficient is computed between the power data for the comparison period and the power data in a pattern waveform.

Next, the same process as the above is repeatedly performed while shifting the comparison period to the downstream side until the starting point of the comparison period reaches a search ending point. The starting point of the comparison period having a largest correlation coefficient is determined as a reference starting point of a single-cycle. The determined reference starting point of the single-cycle is transmitted to the start time detector 131.

Next, a processing operation in the power waveform analyzer 213 of the monitoring device 201 having the above configuration is described with reference to FIG. 17. FIG. 17 schematically illustrates the processing operation of the single-cycle detector 21 in the power waveform analyzer 213. The process from the acquisition of the power data of predetermined duration from the power data storage 30 (S20) to the determination of the filtering function by the function determiner 122 (S23) is the same as those in FIG. 14, thus the illustration thereof is omitted.

After step S23, the filtering process executor 123 performs a filtering process on the power data and the power data in a pattern waveform acquired from the pattern waveform storage 103 by use of the determined filtering function (S30). Next, the pattern matcher 130 performs pattern matching on the filtered power data by use of power data in a post-filtering pattern waveform (S31). Using the result of the pattern matching, the pattern matcher 130 detects a starting point of a portion of the filtered power data that most resembles the power data in the post-filtering waveform as a reference starting point of a single-cycle (S32).

Next, the start time detector 131 detects starting points of other single-cycles in the filtered power data by use of the detected reference starting point of the single-cycle (S33). Then, using the detected stating points of the other single-cycles and the reference starting point of the single-cycle, the single-cycle detector 21 detects power data for a single-cycle portion from the power data of predetermined duration acquired from the power data storage 30, and outputs the detected power data (S34). Thereafter, the processing operation is completed.

Eleventh Embodiment

Next, another embodiment of the present invention is described with reference to FIGS. 18 and 19. A monitoring device 201 of the present embodiment is different from the monitoring device 201 shown in the tenth embodiment in that a pattern waveform generator 113 is further provided to the power waveform analyzer 213. Components having functions similar to those described in the previous embodiments are provided with the same numerical references, and illustration thereof is omitted.

FIG. 18 illustrates schematic configurations of the single-cycle detector 21 and the pattern waveform generator 113 included in the power waveform analyzer 213, and the memory 16 that stores data used by the single-cycle detector 21 and the pattern waveform generator 113, in the monitoring device 201 of the present embodiment. The single-cycle detector 21 is the same as the single-cycle detector 21 shown in FIG. 15, thus the description thereof is omitted.

A method, with which the normal waveform extractor 132 determines whether or not a waveform is normal, is described. First, one or more feature amounts Fi that characterize a single-cycle waveform are selected in advance. In this embodiment, a cycle time F1 and a total power of a single-cycle F2 are used as the feature amount Fi. Other examples of the feature amount Fi include basic statistical measurements, specifically, an average, a variance, a standard deviation, a root means square, a maximum value, a minimum value, a kurtosis, a skewness, and the like. The kurtosis indicates a degree of peakedness of a distribution of electric power in a single-cycle with respect to a normal distribution. The skewness indicates a degree of asymmetry of a distribution of electric power in a single-cycle with respect to a normal distribution.

Next, the feature amount Fi is computed for each of the received single-cycle power data. From a set of the computed feature amount Fi, a median mdi and a standard deviation sdi are computed. This process is repeated for each of the feature amount Fi.

Then, single-cycle power data is extracted as a normal waveform data when all the feature amounts Fi of the power data meets the following condition. The condition is that an absolute value abs (Fi−mdi), which is an absolute value of difference between the feature amount Fi and the median mdi, is smaller than the standard deviation sdi. Thereafter, the extracted data is transmitted to the pattern generator 133. In this embodiment, single-cycle power data that satisfies the following condition is extracted:

$$\text{abs}(F1-md1)<sd1, \text{ and } \text{abs}(F2-md2)<sd2.$$

The pattern generator 133 generates a pattern waveform by use of a plurality of normal waveform data transmitted from the normal waveform extractor 132. Specifically, the pattern generator 133 extracts power values from the plurality of normal waveform data at the time when a same amount of time has elapsed from respective starting points. Then, the pattern generator 133 calculates a median of the extracted plurality of electric power values. The computed median is determined as a power value of a pattern waveform for the elapsed time. A pattern waveform is generated by repeating the above process for all the elapsed time. The pattern generator 133 stores data of the generated pattern waveform in the pattern waveform storage 103.

Next, a processing operation in the pattern waveform analyzer 213 of the monitoring device 201 having the above configuration is described with reference to FIG. 19. FIG. 19 schematically illustrates the processing operation of the pattern waveform generator 113 in the power waveform analyzer 213.

As shown in FIG. 19, first, the normal waveform extractor 132 receives single-cycle power data detected by the single-cycle detector 21 from the power data of predetermined duration (S40), and then extracts the power data having a normal waveform as normal waveform data (S41). Next, the pattern generator 133 generates a pattern waveform by use of a plurality of the extracted normal waveform data (S42), and stores data of the generated pattern waveform in the pattern waveform storage 103 (S43). Then, the processing operation is completed.

Thus, in the present embodiment, an appropriate pattern waveform can be automatically acquired even when a pattern waveform is not known in advance.

In the above embodiment, the present invention is applied to the monitoring device 201 of the production equipment 3. The present invention can be applicable to a monitoring device of an arbitrary device that repeatedly performs a predetermined process and requires maintenance. For example, an engine system of a car repeats actions and requires maintenance. Thus, in applying the present invention to a monitoring device of the engine system of the car, timing of maintenance can be easily determined from an aspect of improving fuel efficiency. Further, timing of maintenance can be accurately determined considering an increase in cost required for the maintenance and a reduction in cost due to an improvement in fuel efficiency.

As described above, the operation information output device of the present invention is an operation information output device that outputs operation information of production equipment, and includes a power data acquirer that acquires time-series data of a physical quantity consumed or generated when the production equipment performs a process; a single cycle detector that detects time-series data of predetermined duration from the time-series data of the physical quantity acquired by the power data acquirer; and an operation information acquirer that acquires the operation information of the production equipment, using the time-series data detected by the single cycle detector.

A method that controls an operation information output device according to the present invention is a method that controls an operation information output device that outputs operation information of production equipment, and includes a physical quantity acquiring step that acquires time-series data of a physical quantity consumed or generated when the production equipment performs a process; a data detecting step that detects time-series data of predetermined duration from the time-series physical quantity data acquired in the physical quantity acquiring step; and an operation information acquiring step that acquires the operation information of the production equipment, using the time-series data detected in the data detecting step.

According to the above-described configuration or method, the time-series data of predetermined duration is detected from the time-series data of the physical quantity that is consumed or generated when the production equipment performs the process. Then, the operation information is acquired from the detected time-series data. Thus, the operation information can be acquired only from the time-series data of the physical quantity that is consumed or generated when the production equipment performs the process, thereby making it possible to easily acquire the operation information.

Examples of the predetermined duration include, for example, a design cycle time value of the production equipment.

In the operation information output device according to the present invention, it is preferable that the physical quantity be electric energy or electric current.

In many cases, electric energy or electric current consumed by production equipment can be measured by an existing power meter. Alternatively, a power meter can be easily installed in the production equipment. Thus, when the physical quantity is electric energy or electric current, it is possible to acquire the physical quantity with a simple configuration.

In the operation information output device according to the present invention, it is preferable that the single cycle detector detect a single-cycle portion of the time-series physical quantity data acquired by the power data acquirere, when the single-cycle is a period from a start to an end of a process on one production object performed by the production equipment.

With the above configuration, it is possible to calculate a cycle time, which is a period from a start to an end of a process on one production object in a production line, by detecting a single-cycle portion. Further, a production quantity can be calculated from the cycle time. Furthermore, a product type can be determined from a feature amount of the time-series data for the single-cycle portion. Thus, detailed operation information can be acquired from the time-series physical quantity data.

In the operation information output device according to the present invention, the single cycle detector may detect a single-cycle portion of the time-series data by detecting a rising point of the physical quantity.

With the above configuration, the rising point of the physical quantity is detected. Thus, it is possible to detect the single-cycle portion even when a waveform of the single-cycle is not clear.

In the operation information output device according to the present invention, the single cycle detector may detect the single-cycle portion of the time-series data, by detecting a starting point of the single-cycle, using a pre-stored waveform pattern.

With the above configuration, the starting point of the single-cycle is detected. Thus, it is possible to accurately detect the time-series data for a period from a start to an end of the single-cycle.

The operation information output device according to the present invention may include a pattern waveform generator that generates a pattern waveform for the single-cycle of the time-series physical quantity data, using the time-series data detected by the single cycle detector.

With the above configuration, the waveform for the single-cycle is generated from the detected time-series data. Thus, it is possible to acquire a proper waveform for the single-cycle even when a waveform for the single cycle is not known beforehand.

In the operation information output device according to the present invention, the single cycle detector may detect time-series data, by comparing a pre-stored pattern of the time-series physical quantity data with a pattern of the time-series physical quantity data acquired by the power data acquirer.

With the above configuration, it is possible to improve accuracy in detection, compared to, for example, a case where time-series data is detected by comparing with a threshold value.

In the operation information output device according to the present invention, the physical quantity may be an amount of displacement of the production equipment generated when the production equipment performs the process.

With the above configuration, the physical quantity is the amount of displacement of the production equipment generated when the production equipment performs the process. The amount of displacement can be easily detected by a vibration sensor, thereby making it possible to acquire the physical quantity with a simple configuration.

The operation information output device may be constructed by a computer. In such a case, the present invention includes a program that controls the operation information output device configured with a computer that carries out the method to control the operation information output device by performing each of the above steps. Furthermore, the present invention includes a computer-readable recording medium that stores the control program.

A monitoring device according to the present invention is a monitoring device that monitors equipment performing a process, and includes, in order to address the above circumstances, a power data acquirer that acquires time-series data of a physical quantity consumed or generated when the equipment performs the process; a single cycle detector that detects time-series data for a predetermined period from the time-series physical quantity data acquired by the power data acquirer; and a maintenance determiner that determines whether or not maintenance should be performed on the equipment based on the duration of the time-series data detected by single cycle detector.

A control method according to the present invention is a method that controls a monitoring device that monitors equipment performing a process, and includes, in order to address the circumstances above, a physical quantity acquiring step that acquires time-series data of a physical quantity consumed or generated when the equipment performs the process; a detecting step that detects time-series data for a predetermined period from the time-series physical quantity data acquired in the physical quantity acquiring step; and a maintenance determining step that determines whether or not maintenance should be performed on the equipment based on the period of the time-series data detected in the detecting step.

Herein, examples of time-series data detected by the single cycle detector include time-series data of a cycle time, time-series data including a plurality of the cycle times, time-series data of a predetermined period, and the like. A cycle time is an amount of time required for one process of repetitive processes, such as a work, a task or a job, and is a unit of frequency or a cycle of the process.

When the predetermined period becomes short, an amount of time required for equipment to perform a process also becomes short, thereby improving a processing capacity of the equipment. In other words, the predetermined period is a quantity that relates to an improvement of a processing capacity of equipment.

Thus, with the above configuration and method, the time-series data of the physical quantity consumed or generated when the equipment performs the process is acquired. The time-series data of the predetermined period is detected from the acquired time-series data. Based on duration of the acquired time-series data, a determination is made on whether or not maintenance should be performed on the equipment. Thereby, it is possible to determine whether or not maintenance should be performed from an aspect of improving a processing capacity of the production equipment. In addition, since used measured value is only time-series data of a physical quantity consumed or generated when equipment performs a process, timing of maintenance can be easily determined.

In the monitoring device according to the present invention, the physical quantity may be electric energy or electric current consumed by the equipment when performing the process. In many cases, electric energy or electric current consumed by the equipment can be measured by an existing power meter. Alternatively, a power meter can be easily installed in the equipment in many cases. In such a case, it is possible to measure the physical quantity with a simple configuration.

The monitoring device according to the present invention further includes a storage that stores a predetermined maintenance reference value. The maintenance determiner may determine that the maintenance should be performed, when the cycle time exceeds the maintenance reference value. The maintenance reference value can be arbitrary set, for example, by multiplying a cycle time in the beginning or immediately after maintenance by a predetermined ratio (i.e., 1.2).

The monitoring device according to the present invention further includes a storage that stores a cost of the maintenance. The maintenance determiner may calculate a profit growth for a case where the maintenance is performed. The maintenance determiner may determine that the maintenance should be performed, when an integrated value of the calculated profit growth exceeds the maintenance cost in the storage.

For example, the monitoring device further includes the storage that stores the maintenance cost, a profit rate that indicates profit by one process, and a cycle time reference value that is a cycle time of the beginning or immediately after maintenance. The maintenance determiner calculates a profit growth for a case where the maintenance is performed, using the time-series cycle time data detected by the single cycle detector, and the profit rate and the cycle time reference value in the storage. When the integrated value of the calculated profit growth exceeds the maintenance cost in the storage, the maintenance determiner may determine that the maintenance should be performed.

In this case, an improvement in a processing capacity due to the maintenance can be quantitatively evaluated as the profit growth. The improvement in the processing capacity due to the maintenance can be quantitatively compared with the maintenance cost. Thus, it is possible to accurately determine timing of the maintenance.

The profit growth can be obtained as follows. The number of processing processed by equipment for a predetermined period can be calculated from time-series data for the period and a cycle time. A reference processing number can be calculated based on the processing number for the period, the cycle time, and the cycle time reference value. Then, the processing number for the period is subtracted from the reference processing number. Thereafter, by multiplying it by the profit rate, the profit growth can be calculated.

In the monitoring device according to the present invention, the physical quality may be an amount of displacement of the equipment generated while the equipment performs the processes. The amount of displacement can be easily detected with a vibration sensor. Thus, in the above case, the physical quantity can be acquired with a simple configuration.

In addition, examples of the physical quantity relating to the consumed energy may include electric power and electric current in a case where the consumed energy is electric energy. The examples of the physically quantity may further include flow volume of the combustible fluid in a case where the consumed energy is heat of combustible fluid, such as gas, petroleum, and the like. Further, the electric power may be acquired by time differentiating electric energy or may be acquired as instantaneous power.

The monitoring device of the present invention further includes a storage that pre-stores a design cycle-time value that is a design value for a period from a start to an end of the process performed by the equipment. It is preferable that the single cycle detector further includes a cycle start detector that detects a start-point of the time-series single-cycle data based on the design cycle time value.

For example, the monitoring device of the present invention further includes a storage that pre-stores a design cycle time value that is a design value for a period from a start to an end of the process performed by the equipment. The single cycle detector may include a frequency analyzer that performs a frequency analysis on the time-series data acquired by the power data acquirer, and detects a frequency having strongest spectrum on or around the design cycle time value as a fundamental frequency; a filtering processor that performs filtering process on the time-series data to emphasize a frequency component on and around the fundamental frequency detected by the frequency analyzer; and a cycle start detector that detects a starting point of the time-series cycle time data based on the time-series data filtered by the filtering processor.

In this case, the frequency component of the cycle time that is equal to or close to the fundamental frequency is emphasized by the filtering process, hence, it become easy to detect time-series cycle time data.

The cycle start detector may detect a starting point of the time-series cycle time data by detecting a rising point of filtered time-series data, using the filtered time-series data and its second order differential data.

Moreover, a storage that stores waveform pattern information indicating waveform pattern of the time-series cycle time data may be further included. The cycle start detector may detect a starting point of the time-series cycle time data by detecting time-series cycle time data that matches the waveform pattern information stored in the storage.

The monitoring device of the present invention may further include a storage that stores waveform pattern information indicating a waveform pattern of the time-series cycle time data; and a waveform pattern generator that generates the waveform pattern using a plurality of time-series cycle time data detected by the single cycle detector, and stores the generated waveform pattern in the storage. In this case, it is not necessary to pre-store the waveform pattern information in the storage.

In addition, each step in the monitoring device can be executed by a computer with a monitoring device control program in the computer. Furthermore, an arbitrary computer can execute the monitoring device control program by storing the monitoring device control program in a computer readable recording medium.

The present invention is not limited to the above embodiments. Various changes are possible within a scope of claims, and embodiments obtained from appropriate combination of technology disclosed in the different embodiments are also included in the scope of this invention.

Lastly, each component of the operation information output device 1, especially, the power waveform analyzer 13, the operation information controller 14, and the vibration waveform analyzer 18 may be configured with a hardware logic, or a software employed along with a CPU (central processing unit) as described in the following.

Further, each component of the monitoring device 201, especially, the power waveform analyzer 213, the maintenance determiner 214, the vibration waveform analyzer 218 may be configured with a hardware logic, or a software employed along with a CPU (central processing unit) as described in the following.

Specifically, the operation information output device 1 and the monitoring device 201 include a CPU that executes instructions of a control program that executes each function; a ROM (read only memory) that stores the program; a RAM (random access memory), in which the program is executed; a storage (recording medium), such as a memory, that stores the program and various data; and the like. The operation information output device 1 and the monitoring device 201 are provided with a recording medium that stores computer-readable program codes (an executable program, an intermediate code program, and a source program) of the control program of the operation information output device 1 and the monitoring device 201, the control program being software that performs the above functions. Further, a computer (alternatively, CPU or MPU (microprocessor unit)) reads out and executes the program codes stored in the recording medium. Thereby, the object of the present invention can be also achieved.

Examples of the recording medium include, for example, a tape, such as a magnetic tape, a cassette tape, and the like; a disc including an magnetic disk such as a floppy (a registered trademark) disc, a hard disc and the like, and an optical disc such as a CD-ROM (compact disc read-only memory), MO (magneto-optical), MD (Mini Disc), DVD (digital versatile disc), CD-R (CD Recordable) and the like; a card, such as an IC card (including a memory card), an optical card, and the like; a semiconductor memory, such as a mask ROM, EPROM (erasable programmable read-only memory), EEPROM (electrically erasable and programmable read-only memory), a flash ROM; and the like.

The operation information output device 1 and the monitoring device 201 may be configured to be connectable to a communication network, thorough which the program codes may be provided. The communication network is not limited to a specific type, and may be configured with, for example, the interne, an intranet, an extranet, LAN (local area network), ISDN (integrated services digital network), VAN (value-added network), CATV (community antenna television) communication network, a virtual private network, a telephone network, a mobile communication network, a satellite communication network, or the like. A transmission medium that configures the communication network is not limited to a specific type, and may be configured with, for example, a wired medium, such as an IEEE (institute of electrical and electronic engineers) 1394, a USB, a power-line carrier, a cable TV line, a telephone line, an ADSL (asynchronous digital subscriber loop) line and the like; or a wireless medium, such as an infrared ray including an IrDA (infrared data association) and a remote controller, a Bluetooth (a registered trademark), an 802.11 wireless LAN, an HDR (high data rate), a mobile communication network, a satellite connection network, a digital terrestrial communication, and the like. The present invention can be also executed by an electronic transmission of the program code, such as a computer data signal embedded in the transmitted wave.

It is noted that the foregoing examples have been provided merely for the purpose of explanation and are in no way to be construed as limiting of the present invention. Changes may be made, within the purview of the appended claims, as presently stated, without departing from the spirit of the present invention.

INDUSTRIAL APPLICABILITY

The operation information output device of the present invention detects a single-cycle of production equipment from time-series data of a physical quantity consumed or generated by the production equipment in a production line. Thus, the operation information output device of the present invention is suitable for equipment that outputs operation information that can be calculated and determined by use of the single-cycle.

The monitoring device of the present invention can determine whether or not maintenance should be performed from an aspect of improving productivity by determining the necessity of the maintenance based on a cycle time, that is, a period of a single-cycle portion detected from time-series data of a physical quantity consumed or generated when production equipment performs a process. Thus, the monitoring device of the present invention can be used as a monitoring device for predetermined equipment that repeatedly performs predetermined processes and that requires maintenance.

DESCRIPTION OF REFERENCE NUMERALS

1 Operation information output device
3 Production equipment (Equipment)
11 Power data acquirer
17 Vibration data acquirer
20 Operation information acquirer)
21 Single-cycle detector
103 Pattern waveform storage (Memory)
112 Cycle start detector
113 Pattern waveform generator
201 Monitoring device
214 Maintenance determiner
216 Memory
234 Maintenance information storage (Memory)
B Integrated value of profit growth
ΔB Profit growth
CT Cycle time
Dct Design cycle time value
MR Maintenance reference value

What is claimed is:

1. An operation information output device that outputs operation information of production equipment comprising:
 a power data acquirer that acquires measured time-series data of a physical quantity consumed or generated when the production equipment performs a process, the power data acquirer comprising a power meter or a vibration sensor;
 a single cycle detector that detects time-series data of predetermined duration from the time-series data of a physical quantity acquired by the power data acquirer; and
 an operation information acquirer that acquires operation information of the production equipment, using the time-series data detected by the single cycle detector,
 wherein the single cycle detector detects a single-cycle portion of the time-series data of a physical quantity acquired by power data acquirer where the single cycle is from a start to an end of a process on one production object performed by the production equipment,
 wherein the physical quantity is an amount of displacement of the production equipment generated when the production equipment performs the process, and
 wherein the operation information output device outputs the operation information of the production equipment in order to determine whether to perform maintenance based on a cycle time.

2. The operation information output device according to claim 1, wherein the single cycle detector detects a single-cycle portion of the time-series data by detecting a rising point of the physical quantity.

3. The operation information output device according to claim 1, wherein the single cycle detector detects a single-cycle portion of the time-series data by detecting a starting point of the single-cycle, using a pre-stored waveform pattern.

4. The operation information output device according to claim 1, comprising:
 a pattern waveform generator that generates a pattern waveform of a single-cycle of the time-series data of a physical quantity, using the time-series data of a physical quantity detected by the single cycle detector.

5. The operation information output device according to claim 1, wherein the single cycle detector detects time-series data by comparing a pre-stored pattern of the time-series data of a physical quantity with a pattern of the time-series data of a physical quantity acquired by the power data acquirer.

6. A non-transitory computer readable storage medium having computer instructions stored thereon comprising a program that controls an operation information output device that outputs operation information of production equipment, the program causing the computer to perform:
 acquiring, by a power meter or a vibration sensor, measured time-series data of a physical quantity consumed or generated when the production equipment performs a process;
 detecting time-series data of predetermined duration from the acquired time-series data of a physical quantity; and
 acquiring the operation information of the production equipment, using the detected time-series data, and storing the operation information in a memory,
 wherein the detecting detects a single-cycle portion of the acquired time-series data of a physical quantity where the single cycle is from a start to an end of a process on one production object performed by the production equipment,
 wherein the physical quantity is an amount of displacement of the production equipment generated when the production equipment performs the process, and
 wherein the operation information output device outputs the operation information of the production equipment in order to determine whether to perform maintenance based on a cycle time.

7. A method that controls an operation information output device that outputs operation information of production equipment, comprising:
 acquiring, by a power meter or a vibration sensor, measured time-series data of a physical quantity consumed or generated when the production equipment performs a process;
 detecting time-series data of predetermined duration from the acquired time-series data of a physical quantity; and
 acquiring the operation information of the production equipment, using the detected time-series data, and storing the operation information in a memory,
 wherein the detecting detects a single-cycle portion of the acquired time-series data of a physical quantity where the single cycle is from a start to an end of a process on one production object performed by the production equipment, wherein the physical quantity is an amount of displacement of the production equipment generated when the production equipment performs the process, and wherein the operation information output device outputs the operation information of the production equipment in order to determine whether to perform maintenance based on a cycle time.

8. A monitoring device that monitors equipment performing a process comprising:

a power data acquirer that acquires measured time-series data of a physical quantity consumed or generated when the equipment performs the process, the power data acquirer comprising a power meter or a vibration sensor;

a single cycle detector that detects time-series data for a predetermined period from the time-series data of a physical quantity acquired by the power data acquirer; and a maintenance determiner that determines whether maintenance should be performed on the equipment based on duration of the time-series data detected by the single cycle detector, wherein the physical quantity is an amount of displacement of the equipment generated when the equipment performs the process, and wherein maintenance is performed on the equipment based on a determination by the maintenance determiner.

9. The monitoring device according to claim 8, wherein the predetermined period is a cycle time of the equipment.

10. The monitoring device according to claim 9, wherein the physical quantity is electric energy or electric current consumed by the equipment while performing the process.

11. The monitoring device according to claim 9, further comprising:

a memory that stores a predetermined maintenance reference value, wherein, when the cycle time exceeds the maintenance reference value, the maintenance determiner determines that the maintenance should be performed.

12. The monitoring device according to claim 9, further comprising:

a memory that stores a cost of the maintenance, wherein the maintenance determiner calculates a profit growth where the maintenance is performed; and determines that the maintenance should be performed, when an integrated value of the calculated profit growth exceeds the maintenance cost in the memory.

13. The monitoring device according to claim 9, further comprising:

a memory that pre-stores a design cycle time value that is a design value for a period from a start to an end of the process performed by the equipment, wherein the single cycle detector comprises a cycle start detector that detects a starting point of time-series cycle time data based on the design cycle time value.

14. The monitoring device according to claim 13, further comprising:

a memory that stores waveform pattern information indicating a waveform pattern of the time-series cycle time data, wherein the cycle start detector detects a starting point of the time-series cycle time data by detecting time-series cycle time data that matches the waveform pattern information stored in the memory.

15. The monitoring device according to claim 9, further comprising:

a memory that stores waveform pattern information indicating a waveform pattern of the time-series cycle time data; and a waveform pattern generator that generates the waveform pattern, using a plurality of time-series cycle time data detected by the single cycle detector, and stores the generated waveform pattern in the memory.

16. A method that controls a monitoring device that monitors equipment performing a process comprising:

acquiring, by a power meter or a vibration sensor, measured time-series data of a physical quantity consumed or generated when the equipment performs the process;

detecting time-series data for a predetermined period from the acquired time-series physical quantity data, and storing the detected time-series data in a memory; and determining whether maintenance should be performed on the equipment based on duration of the detected time-series data, wherein the physical quantity is an amount of displacement of the equipment generated when the equipment performs the process, and wherein maintenance is performed on the equipment based on a determination by the maintenance determiner.

17. A non-transitory computer readable storage medium having computer instructions stored thereon comprising a program that controls a monitoring device that monitors equipment performing a process, the program causing the computer to perform:

acquiring, by a power meter or a vibration sensor, measured time-series data of a physical quantity consumed or generated when the equipment performs the process;

detecting time-series data for a predetermined period from the acquired time-series physical quantity data, and storing the detected time-series data in a memory; and determining whether maintenance should be performed on the equipment based on duration of the detected time-series data, wherein the physical quantity is an amount of displacement of the equipment generated when the equipment performs the process, and wherein maintenance is performed on the equipment based on a determination by the maintenance determiner.

* * * * *